(12) United States Patent
Kasegawa

(10) Patent No.: US 12,135,428 B2
(45) Date of Patent: Nov. 5, 2024

(54) OPTICAL DEVICE, IMAGE DISPLAY DEVICE, AND DISPLAY DEVICE

(71) Applicant: SONY GROUP CORPORATION, Tokyo (JP)

(72) Inventor: Ryo Kasegawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 619 days.

(21) Appl. No.: 17/421,756

(22) PCT Filed: Dec. 10, 2019

(86) PCT No.: PCT/JP2019/048256
§ 371 (c)(1),
(2) Date: Jul. 9, 2021

(87) PCT Pub. No.: WO2020/149053
PCT Pub. Date: Jul. 23, 2020

(65) Prior Publication Data
US 2022/0091421 A1    Mar. 24, 2022

(30) Foreign Application Priority Data
Jan. 16, 2019 (JP) .................................. 2019-005135

(51) Int. Cl.
*G02B 27/01* (2006.01)
*F21V 8/00* (2006.01)

(52) U.S. Cl.
CPC ....... *G02B 27/0172* (2013.01); *G02B 6/0076* (2013.01); *G02B 2027/0178* (2013.01)

(58) Field of Classification Search
CPC ............................... G02B 27/01–0189; G02B 2027/0105–0198; G02B 6/0076
See application file for complete search history.

(56) References Cited

U.S. PATENT DOCUMENTS 10,073,267 B2    4/2018    Tekolste et al.
10,025,093 B2    7/2018    Wall et al.
(Continued)

FOREIGN PATENT DOCUMENTS

CN    101228483 A    7/2008
CN    101460884 A    6/2009
(Continued)

OTHER PUBLICATIONS

International Search Report prepared by the Japan Patent Office on Jan. 27, 2020, for International Application No. PCT/JP2019/048256.

*Primary Examiner* — Bao-Luan Q Le
*Assistant Examiner* — Christopher A Lamb, II
(74) *Attorney, Agent, or Firm* — Sheridan Ross PC

(57) ABSTRACT

The optical device includes a first light guide plate, a first deflection unit 30 including three deflection members, a second light guide plate, and a first deflection unit including three deflection members, a part of a light emitted from the image formation device is incident on the first deflection member and emitted from the third deflection member via the light guide plate and the second deflection member, and when a propagation direction of a light deflected by the second deflection member in the first light guide plate is a first direction, and a propagation direction of a light deflected by the second deflection member in the second light guide plate is a second direction, the first direction is non-parallel to the second direction and is opposite to the second direction.

20 Claims, 22 Drawing Sheets

(56) References Cited

U.S. PATENT DOCUMENTS

| | | |
|---|---|---|
| 2006/0132914 A1 | 6/2006 | Weiss |
| 2009/0303599 A1 | 12/2009 | Levola |
| 2010/0321781 A1 | 12/2010 | Levola |
| 2011/0096401 A1 | 4/2011 | Levola |
| 2014/0330966 A1 | 11/2014 | Marton et al. |
| 2019/0011708 A1* | 1/2019 | Schultz ................ G02B 6/0016 |
| 2019/0331921 A1 | 10/2019 | Suzuki et al. |

FOREIGN PATENT DOCUMENTS

| | | |
|---|---|---|
| CN | 108474879 A | 8/2018 |
| JP | 2009-539129 | 12/2007 |
| JP | 2008-546020 | 12/2008 |
| JP | 2009-133998 | 6/2009 |
| JP | 2010-032997 | 2/2010 |
| WO | WO 2017/120320 | 7/2017 |
| WO | WO 2018/135193 | 7/2018 |
| WO | WO 2018/198587 | 11/2018 |

* cited by examiner

OPTICAL DEVICE, IMAGE DISPLAY DEVICE, AND DISPLAY DEVICE

CROSS REFERENCE TO RELATED APPLICATIONS

This application is a national stage application under 35 U.S.C. 371 and claims the benefit of PCT Application No. PCT/JP2019/0048256 having an international filing date of 10 Dec. 2019, which designated the United States, which PCT application claimed the benefit of Japanese Patent Application No. 2019-005135 filed 16 Jan. 2019, the entire disclosures of each of which are incorporated herein by reference.

TECHNICAL FIELD

The present disclosure relates to an optical device, an image display device provided with such an optical device, a display device provided with such an image display device, and more specifically, a display device used for a head-mounted display (HMD).

BACKGROUND ART

In recent years, development of a head-mounted display (HMD) that displays an image from an image formation device on an optical device placed in front of an observer has been enthusiastically promoted. Then, although various types of head-mounted displays are being studied, there are strong demands for further widening of the angle of view of the displayed image in order to provide a more realistic image for the head-mounted display. In order to meet such demands, a head-mounted display in which three deflection means are arranged on a light guide plate constituting an optical device is known, for example, from US Patent Publication 2006/0132914A1 or US Patent Publication 2014/0330966A1.

Furthermore, Japanese Patent Application Laid-Open No. 2009-133998 discloses an image display device including:
 (A) an image formation device having a plurality of pixels arranged in a two-dimensional matrix.
 (B) a collimating optical system that causes lights emitted from the pixels of the image formation device to be parallel lights, and
 (C) an optical device in which lights caused to be multiple parallel lights having different traveling directions by a collimating optical system are incident, guided, and emitted,
in which the optical device includes
 (a) a light guide plate in which an incident light propagates inside by total reflection and is thereafter emitted,
 (b) a first diffraction grating member that includes a reflective type volume hologram diffraction grating that diffracts and reflects the light incident on the light guide plate so that the light incident on the light guide plate is totally reflected inside the light guide plate, and is arranged on the light guide plate, and
 (c) a second diffraction grating member constituted of a reflective type volume hologram diffraction grating that diffracts and reflects the light propagating inside the light guide plate by total reflection and emits the light from the light guide plate, and is arranged on the light guide plate,
when a normal line of the first diffraction grating member that passes through an origin with a center of the first diffraction grating member being the origin, in which a direction toward the collimating optical system side is a positive direction, is $X_i$ axis, and an axis of the light guide plate that passes through the origin and is orthogonal to the $X_i$ axis, in which a direction toward the second diffraction grating member side is a positive direction, is $Y_i$ axis,
a central light emitted from the central pixel of the image formation device and passing through the center of the collimating optical system is optically parallel to an $X_iY_i$ plane and intersects an $X_iZ_i$ plane at a sharp angle.

CITATION LIST

Patent Document

Patent Document 1: US Patent Publication 2006/0132914A1
Patent Document 2: US Patent Publication 2014/0330966A1
Patent Document 3: Japanese Patent Application Laid-Open No. 2009-133998

SUMMARY OF THE INVENTION

Problems to be Solved by the Invention

However, the head-mounted displays disclosed in the two US Patent Publications described above cannot meet the demands for further widening of the angle of view of the displayed image. Furthermore, since the image display device disclosed in Japanese Patent Application Laid-Open No. 2009-133998 has only two diffraction grating members, the first diffraction grating member and the second diffraction grating member, a display image area can be enlarged in the light guide plate only in one direction propagating from the first diffraction grating to the second diffraction grating.

Therefore, an object of the present disclosure is to provide an optical device having a configuration and a structure capable of further widening the angle of view of a displayed image, an image display device including such an optical device, and a display device including such an image display device.

Solutions to Problems

An optical devices of the present disclosure for achieving the above-described object is an optical device in which a light emitted from an image formation device is incident, guided, and emitted, the optical device including a first light guide plate and a second light guide plate, and a first deflection unit provided on the first light guide plate and a second deflection unit provided on the second light guide plate,
 in which the first deflection unit includes a first A deflection member, a first B deflection member, and a first C deflection member,
 the second deflection unit includes a second A deflection member, a second B deflection member, and a second C deflection member,
 a part of the light emitted from the image formation device is incident on the first A deflection member,
 a light incident on the first A deflection member is deflected by the first A deflection member, totally reflected inside the first light guide plate and incident on the first B deflection member, deflected by the first B deflection member, totally reflected inside the first light guide plate and incident on the first C deflection member, deflected by the first C deflection member, and emitted toward a pupil of an observer, at least a rest of the light emitted from the image formation device is incident on the second A deflection member, a light incident on the second A deflection member is deflected by the second A deflection member, totally reflected inside the second light guide plate, incident on the second B deflection member, deflected by the second B deflection member, totally reflected inside the second light guide plate, incident on the second C deflection member, deflected by the second C deflection member, and emitted toward the pupil of the observer, and when a direction in which a propagation direction of a light deflected by the first B deflection member in the first light guide plate is orthogonally projected onto the first light guide plate is a first direction, and a direction in which a propagation direction of a light deflected by the second B deflection member in the second light guide plate is orthogonally projected onto the first light guide plate is a second direction, the first direction is opposite to the second direction.

An image display device of the present disclosure for achieving the above-described object is an image display device including:

an image formation device; and
an optical device in which a light emitted from the image formation device is incident, guided, and emitted,
in which the optical device includes the optical device of the present disclosure.

A display device of the present disclosure for achieving the above-described object is a display device including:

a frame attached to a head of an observer; and
an Image display device attached to the frame,
in which the image display device includes an image formation device and an optical device in which a light emitted from the image formation device is incident, guided, and emitted, and
the optical device includes the optical device of the present disclosure.

MODE FOR CARRYING OUT THE INVENTION

Figure 1A:
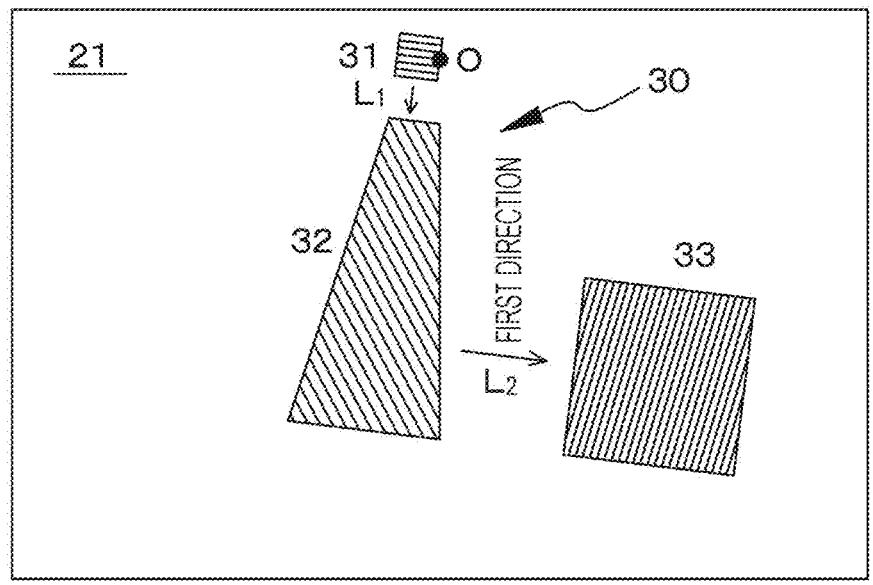
FIGS. 1A and 1B are schematic views of a first light guide plate and a first deflection unit, and a second light guide plate and a second deflection unit, respectively, constituting an optical device of a first embodiment.
Figure 1A:
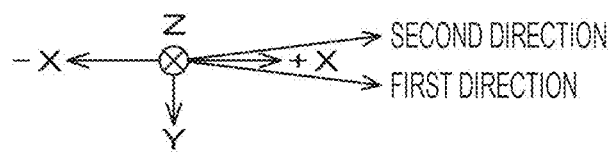

Hereinafter, the present disclosure will be described on the basis of embodiments with reference to the drawings, but the present disclosure is not limited to the examples, and various numerical values and materials in the examples are examples. Note that the description will be made in the following order.
1. Description of optical device, image display device, and display device of present disclosure in general
2. First embodiment (optical device, image display device, and display device of present disclosure)
3. Second embodiment (modification of first embodiment)
4. Others <Description of Optical Device, Image Display Device, and Display Device of Present Disclosure in General>

In an optical device of the present disclosure, an optical device constituting an image display device of the present disclosure, and an optical device constituting a display device of the present disclosure (hereinafter, these may be collectively referred to as an "optical device or the like of the present disclosure"), a configuration can be employed in which a first light guide plate and a second light guide plate are juxtaposed. That is, a configuration can be employed in which the first light guide plate and the second light guide plate are arranged in parallel separately with, for example, an air layer interposed therebetween.

In the optical device or the like of the present disclosure including the above-described preferable configuration, a mode can be employed in which
a point on the first light guide plate where a light beam emitted from an image formation area center point of an image formation device collides with the first light guide plate is an origin,
in an XYZ Cartesian coordinate system passing through the origin,
when an axis including a bisector toward a first direction is a +X axis, the bisector being of a sharp intersection angle within an intersection angle between a straight line passing through the origin and parallel to the first direction and a straight line passing through the origin and parallel to the second direction intersect,
an axis that passes through the origin and is perpendicular to the first light guide plate is a Z axis, and
an axis orthogonal to an X axis and the Z axis is a Y axis, the first deflection unit and the second deflection unit are arranged at positions symmetrical with respect to a YZ plane.

The first direction, which is a direction when a propagation direction of a light deflected by the first B deflection member in the first light guide plate is orthogonally projected onto the first light guide plate, extends in the +X axis direction but extends non-parallel or parallel to the +X axis, and the second direction, which is a direction when a propagation direction of a light deflected by the second B deflection member in the second light guide plate is orthogonally projected onto the first light guide plate, extends in the −X axis direction but extends non-parallel or parallel to the −X axis. That is, the first direction and the second direction are not parallel to each other or are on the same straight line. A mode can be employed in which the first A deflection member and the second A deflection member are arranged at positions symmetrical with respect to a YZ plane, are symmetrical and have the same shape, or have different shapes. Similarly, a mode can be employed in which the first B deflection member and the second B deflection member are arranged at positions symmetrical with respect to the YZ plane, are symmetrical and have the same shape, or have different shapes, and the first C deflection member and the second C deflection member are arranged at positions symmetrical with respect to the YZ plane, are symmetrical and have the same shape, or have different shapes.

In the above-described preferable mode in the optical device or the like of the present disclosure, a configuration can be employed in which
the first deflection unit is arranged in a state of being rotated in a first rotation direction in a counterclockwise direction or a clockwise direction with the Z axis being a center, and
the second deflection unit is arranged in a state of being rotated in a second rotation direction in the clockwise direction or the counterclockwise direction with the Z axis being a center. Then, in this case, a mode can be employed in which when a rotation angle in a first rotation direction is $\varphi_1$ and a rotation angle in the second rotation direction is $\varphi_2$ with reference to the +X axis, $|\varphi_1| = |\varphi_2|$ is satisfied, and moreover, a mode can be employed in which 0 (degrees) < $|\varphi_1| = |\varphi_2|$ ≤ 23 (degrees), preferably, 0 (degrees) < $|\varphi_1| = |\varphi_2|$ ≤ 16 (degrees)

are satisfied. Note that instead of arranging the first deflection unit in the state of being rotated in the first rotation direction, wave vectors of the first A deflection member, the first B deflection member, and the first C deflection member constituting the first deflection unit may be in a state of being rotated in the first rotation direction, and instead of arranging the second deflection unit in the state of being rotated in the second rotation direction, wave vectors of the second A deflection member, the second B deflection member, and the second C deflection member constituting the second deflection unit may be in a state of being rotated in the second rotation direction.

Moreover, in the various preferable modes described above in the optical device or the like of the present disclosure, when an angle formed by a direction of the light incident on the first B deflection member and a direction of a light emitted from the first B deflection member is $\psi_1$, an angle formed by a direction of the light incident on the second B deflection member, and a direction of a light emitted from the second B deflection member is $\psi_2$, 90 degrees < $\psi_1$, and 90 degrees < $\psi_2$ are satisfied, and moreover, a mode can be employed in which 90 degrees < $\psi_1$ ≤ 105 degrees, and 90 degrees < $\psi_2$ ≤ 105 degrees, preferably, 90 degrees < $\psi_1$ ≤ 100 degrees, and 90 degrees < $\psi_2$ ≤ 100 degrees are satisfied, and moreover, a mode can be employed in which $$\psi_1=\psi_2,$$

specifically, but not limited to, $$99.5 \text{ (degrees)} \leq \psi_1 = \psi_2 \leq 100.5 \text{ (degrees)}$$

is satisfied.

Moreover, in the various preferable modes described above in the optical device or the like of the present disclosure, a mode can be employed in which a first B deflection member orthogonal projection image when the first B deflection member is orthogonally projected onto the first light guide plate and a second B deflection member orthogonal projection image when the second B deflection member is orthogonally projected onto the first light guide plate partially overlap (in some cases, in contact), and moreover, a mode can be employed in which an end in a +X axis direction of the first B deflection member orthogonal projection image and an end in a −X axis direction of the second B deflection member orthogonal projection image overlap (in some cases, the end in the +X axis direction of the first B deflection member orthogonal projection image and the end in the −X axis direction of the second B deflection member orthogonal projection image are in contact). Thus, by partially overlapping the first B deflection member orthogonal projection image when the first B deflection member is orthogonally projected onto the first light guide plate and the second B deflection member orthogonal projection image when the second B deflection member is orthogonally projected onto the first light guide plate, it is possible to reliably prevent a cut from occurring in an image at the center of the image. Furthermore, a mode can be employed in which a first C deflection member orthogonal projection image when the first C deflection member is orthogonally projected onto the first light guide plate and a second C deflection member orthogonal projection image when the second C deflection member is orthogonally projected onto the first light guide plate partially overlap (in some cases, in contact), and moreover, a mode can be employed in which an end in a −X axis direction of the first C deflection member orthogonal projection image and an end in a +X axis direction of the second C deflection member orthogonal projection image overlap (in some cases, the end in the −X axis direction of the first C deflection member orthogonal projection image and the end in the +X axis direction of the second C deflection member orthogonal projection image are in contact). Furthermore, a mode can be employed in which a first A deflection member orthogonal projection image when the first A deflection member is orthogonally projected onto the first light guide plate and a second A deflection member orthogonal projection image when the second A deflection member is orthogonally projected onto the first light guide plate partially overlap (in some cases, in contact), and moreover, a mode can be employed in which an end in a +X axis direction of the first A deflection member orthogonal projection image and an end in a −X axis direction of the second A deflection member orthogonal projection image overlap (in some cases, the end in the +X axis direction of the first A deflection member orthogonal projection image and the end in the −X axis direction of the second A deflection member orthogonal projection image are in contact).

Moreover, in the various preferable modes described above in the optical device or the like of the present disclosure, a mode can be employed in which the first A deflection member and the second A deflection member include a volume hologram diffraction grating, and when a wave vector of the first A deflection member is $k^v_{1-A}$, X, Y, and Z components of $k^v_{1-A}$ are $k^X_{1-A}$, $k^Y_{1-A}$, and $k^Z_{1-A}$, a wave vector of the second A deflection member is $k^v_{2-A}$, and X, Y, and Z components of $k^v_{2-A}$ are $k^X_{2-A}$, $k^Y_{2-A}$, and $k^Z_{2-A}$, $$k^X_{1-A}+k^X_{2-A}=0,$$

$$k^Y_{1-A}=k^Y_{2-A}, \text{ and}$$

$$k^Z_{1-A}=k^Z_{2-A}$$

are satisfied, and in this case, a mode can be employed in which the first C deflection member and the second C deflection member include a volume hologram diffraction grating, and when a wave vector of the first C deflection member is $k^v_{1-C}$, X, Y, and Z components of $k^v_{1-C}$ are $k^X_{1-C}$, $k^Y_{1-C}$, $k^Z_{1-C}$, a wave vector of the second C deflection member is $k^v_{2-C}$, and X, Y, and Z components of $k^v_{2-C}$ are $k^X_{2-C}$, $k^Y_{2-C}$, $k^Z_{2-C}$, $$k^X_{1-C}+k^X_{2-C}=0,$$

$$k^Y_{1-C}=k^Y_{2-C}, \text{ and}$$

$$k^Z_{1-C}=k^Z_{2-C}$$

are satisfied, and moreover, a mode can be employed in which the first B deflection member and the second B deflection member include a volume hologram diffraction grating, and when a wave vector of the first B deflection member is $k^v_{1-B}$, X, Y, and Z components of $k^v_{1-B}$ are $k^X_{1-B}$, $k^Y_{1-B}$, $k^Z_{1-B}$, a wave vector of the second B deflection member is $k^v_{2-B}$, and X, Y, and Z components of $k^v_{2-B}$ are $k^X_{2-B}$, $k^Y_{2-B}$, $k^Z_{2-B}$, $$k^X_{1-B}+k^X_{2-B}=0,$$

$$k^Y_{1-B}=k^Y_{2-B}, \text{ and}$$

$$k^Z_{1-B}=k^Z_{2-C}$$

are satisfied, and moreover, a mode can be employed in which $$k^v_{1-A}+k^v_{1-B}+k^v_{1-C}=0, \text{ and}$$

$$k^v_{2-A}+k^v_{2-B}+k^v_{2-C}=0$$

are satisfied. Then, lights incident on the first A deflection member and the second A deflection member and lights emitted from the first C deflection member and the second C deflection member thus have a conjugated relationship. Note that a vector is represented by a superscript letter "v" as described above, and X, Y, and Z components of the vector are represented by superscript letters "X", "Y", and "Z" as described above.

The volume hologram diffraction grating may be a transmissive type or a reflective type, although it depends on the arrangement state of the first A deflection member, the first B deflection member, and the first C deflection member and the second A deflection member, the second B deflection member, and the second C deflection member with respect to the light guide plate. The volume hologram diffraction grating means a hologram diffraction grating that diffracts only +first-order diffracted light.

Moreover, in the optical device or the like of the present disclosure including the preferable configurations and modes described above, a mode can be employed in which
when the first A deflection member, the first B deflection member, and the first C deflection member include a volume hologram diffraction grating, and
average diffraction efficiency of the first A deflection member is $\eta_{1-A}$, average diffraction efficiency of the first B deflection member is $\eta_{1-B}$, and average diffraction efficiency of the first C deflection member is $\eta_{1-C}$ with respect to the light emitted from the image formation device, $\eta_{1-B}/\eta_{1-A}<1$, and $\eta_{1-C}/\eta_{1-A}<1$ are satisfied, and
when the second A deflection member, the second B deflection member, and the second C deflection member include a volume hologram diffraction grating, and
average diffraction efficiency of the second A deflection member is $\eta_{2-A}$, average diffraction efficiency of the second B deflection member is $\eta_{2-B}$, and average diffraction efficiency of the second C deflection member is $\eta_{2-C}$ with respect to the light emitted from the image formation device, $\eta_{2-B}/\eta_{2-A}<1$, and $\eta_{2-C}/\eta_{2-A}<1$ are satisfied.

It is preferable to satisfy $\eta_{1-B}\leq 0.2$, $\eta_{2-B}\leq 0.2$, $\eta_{1-C}\leq 0.2$, and $\eta_{2-C}\leq 0.2$. Here, when light intensity of a light incident on the volume hologram diffraction grating is $I_0$, and light intensity of a +first-order diffracted light diffracted by the volume hologram diffraction grating is $I_1$, the diffraction efficiency $\eta$ is represented by $I_1/I_0$. Diffraction efficiency can be controlled, for example, by the thickness of the volume hologram diffraction grating. That is, if the thickness of the volume hologram diffraction grating is reduced, the value of the diffraction efficiency $\eta$ becomes low. Furthermore, as a refractive index modulation degree $\Delta n$ in the volume hologram diffraction grating increases, the value of the diffraction efficiency $\eta$ decreases. For example, when the diffraction efficiency $\eta=0.2$ and the light (light amount=1.0) incident on the volume hologram diffraction grating is emitted from the volume hologram diffraction grating, and when the amount of light emitted from an area of the volume hologram diffraction grating closest to a light incident part of the volume hologram diffraction grating is $LI_1$, the amount of light emitted from an area of the next closest volume hologram diffraction grating is $LI_2$, the amount of light emitted from an area of the third closest volume hologram diffraction grating is $LI_3$, and the amount of light emitted from an area of the fourth closest volume hologram diffraction grating is $LI_4$, $LI_1=1.0\times 0.2=0.2$, $LI_2=(1.0-0.2)\times 0.2=0.16$, $LI_3=(1.0-0.2-0.16)\times 0.2=0.128$, and $LI_4=(1.0-0.2-0.16-0.128)\times 0.2=0.102$ hold.

In the following description, in order to simplify the explanation, the first A deflection member and the second A deflection member may be collectively referred to as a "first A deflection member and the like", the first B deflection member and the second B deflection member may be collectively referred to as a "first B deflection member and the like", and the first C deflection member and the second C deflection member may be collectively referred to as a "first C deflection member and the like".

In the optical device or the like of the present disclosure including the preferred modes described above, a mode can be employed in which light beams emitted from the image formation area center point of the image formation device are vertically incident on the first A deflection member and the second A deflection member, or incident at a certain angle that is not vertical. That is, in the latter case,
a point on the first light guide plate where a light beam emitted from an image formation area center point of the image formation device collides with the first light guide plate is an origin,
in an XYZ Cartesian coordinate system passing through the origin,
when an axis including a bisector toward a first direction is a +X axis, the bisector being of a sharp intersection angle within an intersection angle between a straight line passing through the origin and parallel to the first direction and a straight line passing through the origin and parallel to the second direction intersect,
an axis that passes through the origin and is perpendicular to the first light guide plate is a Z axis, and
an axis orthogonal to an X axis and the Z axis is a Y axis,
an angle formed by an orthogonal projection image and the X axis when a light beam emitted from the image formation area center point of the image formation device and is incident on the origin is orthogonally projected onto the first light guide plate (XZ plane) is desirably less than 90 degrees, more desirably equal to or more than 70 degrees and less than 90 degrees. Furthermore, it is desirable that the angle formed by the orthogonal projection image and the Y axis when the light beam emitted from the image formation area center point of the image formation device and incident on the origin is orthogonally projected onto the YZ plane is −20 degrees or more and 20 degrees or less.

Furthermore, a mode can be employed in which all lights deflected by the first A deflection member are incident on the first B deflection member,
all lights deflected by the first B deflection member are incident on the first C deflection member,
all lights deflected by the second A deflection member are incident on the second B deflection member, and
all lights deflected by the second B deflection member are incident on the second C deflection member. However, in practice, a part of the light deflected by the first A deflection member and the second A deflection member, and a part of the light deflected by the first B deflection member and the second B deflection member may be lost by the light guide plate.

Moreover, in the optical device or the like of the present disclosure including the preferable modes described above, a mode can be employed in which a refractive index of a material constituting the first light guide plate and the second light guide plate is 1.5 or more, preferably 1.6 or more, and a refractive index of a material constituting the volume hologram diffraction grating is 1.5 or more, preferably 1.6 or more.

In the optical device or the like of the present disclosure including the preferable modes described above, the optical device is a semi-transmissive type (see-through type). Specifically, at least a part of the optical device opposing the eyeballs (pupils) of the observer is semi-transmissive (see-through), and an outside view can be seen through this part of the optical device (specifically, at least the first C deflection member and the second C deflection member). Here, the term "semi-transmissive" does not mean that ½ (50%) of the incident light is transmitted or reflected, but is used in the sense that a part of incident light is transmitted and the rest is reflected.

A single color (for example, green) image can be displayed by the image display device or the display device of the present disclosure. On the other hand, a configuration can be employed in which, in a case of displaying a color image, in order to correspond to diffraction of P types of lights having wavelength bands (or wavelengths) of different P types (for example, P=3, and three types of red, green, and blue), the first A deflection member and the like, the first B deflection member and the like, and the first C deflection member and the like are formed by stacking P layers of diffraction grating layers including volume hologram diffraction gratings. Interference fringes corresponding to one type of wavelength band (or wavelength) are formed on each diffraction grating layer. Alternatively, a configuration can be employed in which in order to correspond to diffraction of P types of lights having different P types of wavelength bands (or wavelengths), P types of interference fringes are formed on the first A deflection member and the like, the first B deflection member and the like, and the first C deflection member and the like including of one diffraction grating layer. Alternatively, for example, a structure may be employed in which the first A deflection member and the like, first B deflection member and the like, and first C deflection member and the like that include a diffraction grating layer including a volume hologram diffraction grating that diffracts and reflects a light having a red wavelength band (or wavelength) are arranged on the first light guide plate and second light guide plate that are the first, the first A deflection member and the like, first B deflection member and the like, and first C deflection member and the like that include a diffraction grating layer including a volume hologram diffraction grating that diffracts a light having a green wavelength band (or wavelength) are arranged on the first light guide plate and second light guide plate that are the second, the first A deflection member and the like, first B deflection member and the like, and first C deflection member and the like that include a diffraction grating layer including a volume hologram diffraction grating that diffracts a light having a blue wavelength band (or wavelength) are arranged on the first light guide plate and second light guide plate that are the third, and these six light guide plates are stacked with gaps therebetween. Alternatively, for example, the first A deflection member and the like, first B deflection member and the like, and first C deflection member and the like that diffract a light having a red or blue wavelength band and the first A deflection member and the like, first B deflection member and the like, and first C deflection member and the like that diffract a light having a green wavelength band may be stacked on one surface of the first light guide plate, and the first A deflection member and the like, first B deflection member and the like, and first C deflection member and the like that diffract a light having a blue or red wavelength band may be arranged on the other surface of the first light guide plate. Similarly, the second A deflection member and the like, second B deflection member and the like, and second C deflection member and the like that diffract a light having a red or blue wavelength band and the second A deflection member and the like, second B deflection member and the like, and second C deflection member and the like that diffract a light having a green wavelength band may be stacked on one surface of the second light guide plate, and the second A deflection member and the like, second B deflection member and the like, and second C deflection member and the like that diffract a light having a blue or red wavelength band may be arranged on the other surface of the second light guide plate. Then, by employing these configurations, diffraction efficiency can be increased, a diffraction acceptance angle can be increased, and a diffraction angle can be optimized when a light having each wavelength band (or wavelength) is diffracted by the first A deflection member and the like, the first B deflection member and the like, and the first C deflection member and the like. It is preferable to arrange a protective member so that the volume hologram diffraction gratings do not come into direct contact with the atmosphere.

As a material constituting the volume hologram diffraction grating, a photopolymer material can be mentioned. The constituent material and basic structure of the volume hologram diffraction grating in the optical device or the like of the present disclosure is only required to be the same as the constituent material and structure of a conventional volume hologram diffraction grating. Interference fringes are formed on the volume hologram diffraction grating from an inside to a surface thereof, and a method of forming such interference fringes themselves is only required to be the same as a conventional formation method. Specifically, for example, it is only required that a material (for example, a photopolymer material) constituting the volume hologram diffraction grating is irradiated with an object light from a first predetermined direction on one side, the material constituting the volume hologram diffraction grating is simultaneously irradiated with a reference light from a second predetermined direction on the other side, and interference fringes formed by the object light and the reference light are recorded inside the material constituting the volume hologram diffraction grating. By appropriately selecting the first predetermined direction, the second predetermined direction, and wavelengths of the object light and the reference light, a desired pitch of the interference fringes on the surface of the volume hologram diffraction grating and a desired inclination angle (slant angle) of the interference fringes can be obtained. The inclination angle of the interference fringes means an angle formed by the surface of the volume hologram diffraction grating and the interference fringes. In a case where it is constituted of a stacked structure of P layers of diffraction grating layers including volume hologram diffraction gratings, stacking of such diffraction grating layers is only required such that the P layers of the diffraction grating layers are separately prepared, and thereafter the P layers of the diffraction grating layers are stacked (bonded) using, for example, an ultraviolet curable adhesive. Furthermore, after preparing one layer of a diffraction grating layer using a photopolymer material having adhesiveness, a photopolymer material having adhesiveness may be sequentially adhered thereon to prepare a diffraction grating layer, thereby preparing P layers of diffraction grating layers.

The inclination angle (slant angle) of the interference fringes may be constant in the volume hologram diffraction grating, or may be changed depending on the value of the angle of view of an image incident on the volume hologram diffraction grating. In a case where the inclination angle of the interference fringes is changed depending on the value of the angle of view of the incident image, it may be changed continuously or stepwise. Furthermore, the diffraction efficiency of the interference fringes may be changed continuously or stepwise by changing the interference ratio between the object light and the reference light.

As the material constituting the volume hologram diffraction grating (photopolymer material constituting a photosensitive material precursor layer before irradiation with the object light and the reference light), any photopolymer material can be used as long as it includes at least a photopolymerizable compound, a binder resin, and a photopolymerization initiator. As the photopolymerizable compound, for example, publicly known photopolymerizable compounds such as an acrylic monomer, a methacrylic monomer, a styrene monomer, a butadiene monomer, a vinyl monomer, and an epoxy monomer can be used. These may be copolymers, monofunctionals or polyfunctionals. Furthermore, these monomers may be used alone or a plurality of them may be used. Any publicly known binder resin can be used, and specifically, cellulose acetate resin, acrylic resin, acrylic acid ester resin, methacrylic acid resin, epoxy resin, urethane resin, polypropylene resin, polyvinyl ether resin, polycarbonate resin, polyamide resin, polyvinyl acetate, vinyl chloride resin, urea resin, styrene resin, butadiene resin, natural rubber resin, polyvinyl carbazole, polyethylene glycol, and phenol resin, and a copolymer, gelatin, and the like of them can be mentioned. The binder resin may also be used alone or a plurality of them may be used. As the photopolymerization initiator, any publicly known photopolymerization initiator can be used. The photopolymerization initiator may be used alone, a plurality of them may be used, or it may be used in combination with a plurality of photosensitizing dyes or a single photosensitizing dye may be used. A plasticizer, a chain transfer agent, and other additives may be appropriately added to the photosensitive material precursor layer. Any material can be used as the material constituting the protective layer for protecting the volume hologram diffraction grating as long as it is transparent, and even if it is formed by coating, a pre-filmed material may be laminated on the photosensitive material precursor layer. As the material constituting the protective layer, for example, polyvinyl alcohol (PVA) resin, acrylic resin, polyurethane resin, polyethylene terephthalate (PET) resin, triacetyl cellulose (TAC) resin, polymethyl methacrylate (PMMA) resin, polypropylene resin, polycarbonate resin, polyvinyl chloride resin, and the like can be mentioned.

In the image display device or the image display device in the display device of the present disclosure including the various preferable modes described above, a mode can be employed in which the image formation device has a plurality of pixels arranged in a two-dimensional matrix. Note that the configuration of such an image formation device will be referred to as a "first configuration image formation device" for convenience.

As the image formation device of the first configuration, for example, an image formation device including a reflective type spatial light modulation device and a light source; an image formation device including a transmissive type spatial light modulation device and a light source; and an image formation device including a light emitting element such as an organic electroluminescence (EL) element, an inorganic EL element, a light emitting diode (LED), and a semiconductor laser element can be mentioned, and among them, an image formation device including a reflective type spatial light modulation device and a light source or an image formation device including an organic EL element is preferable. As the spatial light modulation device, a transmissive type or reflective type liquid crystal display device of a light valve, for example, a liquid crystal on silicon (LCOS) or the like, and a digital micromirror device (DMD) can be mentioned, and a light emitting element can be mentioned as the light source. Moreover, a configuration can be employed in which the reflective type spatial light modulation device includes a liquid crystal display device and a polarizing beam splitter that reflects a part of light from a light source and guides the light to the liquid crystal display device, and passes a part of light reflected by the liquid crystal display device and guides the light to an optical system. As the light emitting element constituting the light source, a red light emitting element, a green light emitting element, a blue light emitting element, and a white light emitting element can be mentioned, or a red light, a green light, and a blue light emitted from the red light emitting element, the green light emitting element, and the blue light emitting element may be mixed and subjected to uniformization of brightness with a light pipe to obtain a white light. As the light emitting element, for example, a semiconductor laser element, a solid-state laser, and an LED can be exemplified. The number of pixels is only required to be determined on the basis of specifications required for the image display device, and as specific values for the number of pixels, 320×240, 432×240, 640×480, 1024×768, 1920×1080, or the like can be exemplified.

Alternatively, in the image display device of the present disclosure or the image display device in the display device including the preferred modes described above, a mode can be employed in which the image formation device includes a light source and a scanning means for scanning with a parallel light emitted from the light source. Note that the configuration of such an image formation device will be referred to as an "image formation device of a second configuration" for convenience.

A light emitting element can be mentioned as a light source in the image formation device of the second configuration, and specifically, a red light emitting element, a green light emitting element, a blue light emitting element, and a white light emitting element can be mentioned, or a red light, a green light, and a blue light emitted from the red light emitting element, the green light emitting element, and the blue light emitting element may be mixed and subjected to uniformization of brightness with a light pipe to obtain a white light. As the light emitting element, for example, a semiconductor laser element, a solid-state laser, and an LED can be exemplified. The number of pixels (virtual pixels) in the image formation device of the second configuration is also only required to be determined on the basis of specifications required for the image display device, and as specific values for the number of pixels (virtual pixels), 320×240, 432×240, 640×480, 1024×768, 1920×1080, or the like can be exemplified. Furthermore, in a case of displaying a color image and a case of forming the light source by a red light emitting element, a green light emitting element, and a blue light emitting element, it is preferable to perform color synthesis using, for example, a cross prism. As the scanning means, for example, micro electro mechanical systems (MEMS) having a micromirror capable of rotating in a two-dimensional direction and a galvano mirror, which horizontally and vertically scans with a light emitted from a light source, can be mentioned.

In the image formation device of the first configuration or the image formation device of the second configuration, a plurality of parallel lights is incident on the light guide plate in an optical system (which is an optical system that causes a light emitted from the image formation device to be a parallel light, and may be referred to as a "parallel light emitting optical system", and specifically, for example, a collimating optical system or a relay optical system), and such a request for being a parallel light is based on the fact that light wave plane information when these lights are incident on the light guide plate needs to be stored even after being emitted from the light guide plate via the first A deflection member and the like, the first B deflection member and the like, and the first C deflection member and the like. Note that in order to generate a plurality of parallel lights, specifically, for example, the light emitting unit of the image formation device is only required to be positioned at a location (position) of a focal length in the parallel light emitting optical system. The parallel light emitting optical system has a function of converting position information of pixels into angle information in the optical system of the optical device. As the parallel light emitting optical system, an optical system having a positive optical power as the whole, in which a convex lens, a concave lens, a free curved prism, and a hologram lens are used alone or in combination, can be exemplified.

In order for the light emitted from the parallel light emitting optical system to enter the first A deflection member and the second A deflection member, it is only required to arrange an appropriate light guide means between the parallel light emitting optical system and the first A deflection member and the second A deflection member. A reflector can be mentioned as the light guide means. Furthermore, the light emitted from the parallel light emitting optical system may be directly condensed on the first A deflection member and the second A deflection member.

The light guide plate has two parallel surfaces (a first surface and a second surface). When a surface of the light guide plate on which a light is incident is a light guide plate incident surface and a surface of the light guide plate from which a light is emitted is a light guide plate emission surface, the first surface may form the light guide plate incident surface and the light guide plate emission surface, or the first surface may form the light guide plate incident surface, and the second surface may form the light guide plate emission surface.

As the material constituting the light guide plate, glass containing optical glass such as quartz glass or BK7, or plastic material (for example, PMMA, polycarbonate resin, acrylic resin, amorphous polypropylene resin, and styrene resin containing AS resin) can be mentioned. The shape of the light guide plate is not limited to a flat plate, and may have a curved shape. As a material having a refractive index of 1.5 or more, BK7, polycarbonate resin, amorphous polypropylene resin, and styrene resin containing AS resin can be exemplified, and as a material having a refractive index of 1.6 or more, acrylic resin can be exemplified.

The image display device may include a light control device. That is, the optical device may overlap at least a part of the light control device. More specifically, it is preferable that at least the first C deflection member, the second C deflection member, and the like of the optical device overlap with the light control device. The light control device will be described in detail later.

In the display device of the present disclosure, a configuration can be employed in which the frame includes a front portion arranged in front of an observer and two temple portions pivotally attached to both ends of the front portion via hinges. Note that a temple tip is attached to a tip portion of each temple portion. The image display device is attached to the frame, and specifically, for example, it is only required to attach the image formation device to an upper part of the front portion. Furthermore, a configuration can be employed in which the front portion and the two temple portions are integrated. That is, when the entire display device of the present disclosure is viewed, the frame has substantially the same structure as ordinary eyeglasses. The material constituting the frame including a pad portion can be formed by the same material as the material forming ordinary eyeglasses, such as metal, alloy, plastic, or a combination thereof. Moreover, a configuration can be employed in which a nose pad is attached to the front portion. That is, when the entire display device of the present disclosure is viewed, an assembly of the frame (including a rim) and the nose pad has substantially the same structure as ordinary eyeglasses. The nose pad can also have a known configuration and structure.

Furthermore, in the display device of the present disclosure, from the viewpoint of design or ease of mounting, it is desirable to employ a mode in which wirings (signal lines, power lines, or the like) from one or two image formation devices extend from a tip portion of the temple tip to the outside via the temple portion and the inside of the temple tip and are connected to a control device (control circuit or control means). Moreover, a mode can be employed in which each image formation device includes a headphone part, and a wiring for the headphone part from each image formation device extends from the tip portion of the temple tip to the headphone part via the temple portion and the inside of the temple tip. As the headphone part, for example, an inner ear type headphone part and a canal type headphone part can be mentioned. More specifically, it is preferable to employ a mode in which the wiring for the headphone part extends from the tip portion of the temple tip to the headphone part so as to wrap around a back side of a pinna (auricle). Furthermore, a mode can be employed in which the imaging device is attached to a center portion of the front portion. Specifically, the imaging device includes, for example, a solid-state image sensor including a CCD or CMOS sensor and a lens. The wiring from the imaging device is only required to be connected to one image display device (or image formation device) via, for example, the front portion, and be further included in the wiring extending from the image display device (or image formation device).

With the display device of the present disclosure, for example, a head-mounted display (HMD) can be formed. Then, the weight and size of the display device can thus be reduced, discomfort when the display device is attached can be significantly reduced, and manufacturing cost can also be reduced. Alternatively, the image display device of the present disclosure can be applied to a head-up display (HUD) provided in a vehicle, an aircraft cockpit, or the like. Specifically, an HUD can be formed such that a virtual image forming area where a virtual image is formed on the basis of the light emitted from the image formation device is arranged on the windshield of a vehicle, an aircraft cockpit, or the like, or an HUD can be formed such that a combiner having a virtual image forming area in which a virtual image is formed on the basis of the light emitted from the image formation device is arranged on the windshield of a vehicle, an aircraft cockpit, or the like.

First Embodiment

Figure 1B:
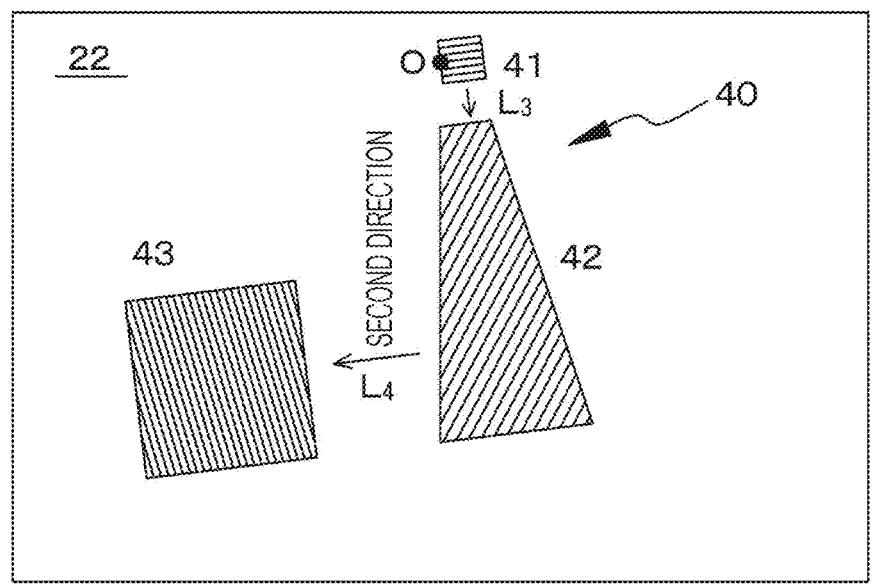
Figure 2A:
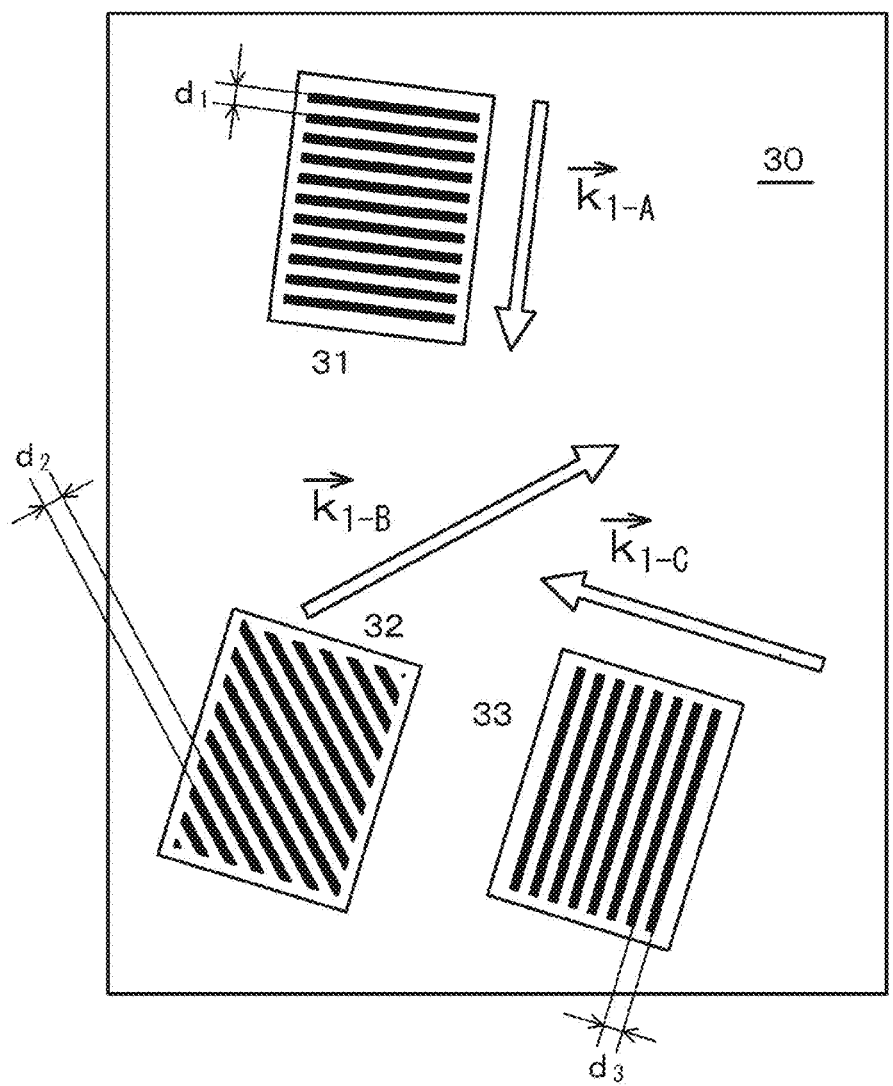
FIGS. 2A and 2B are a schematic view of an arrangement of a first A deflection member, a first B deflection member, and a first C deflection member constituting the optical device of the first embodiment, and a conceptual diagram of wave vectors and the like of the first A deflection member, the first B deflection member, and the first C deflection member, respectively.
Figure 2B:
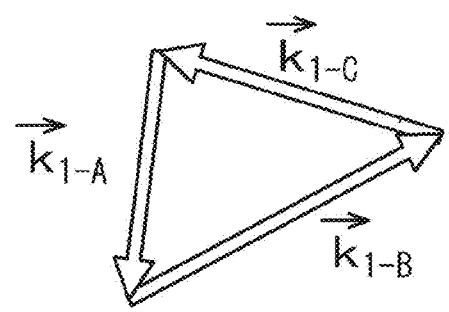
Figure 3A:
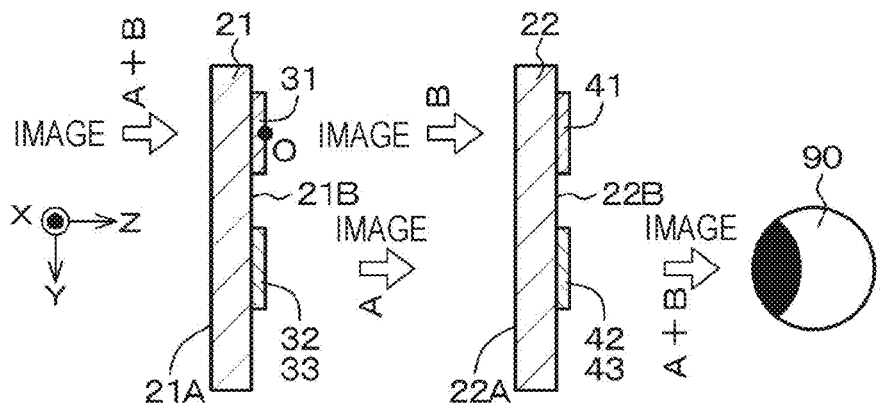
FIGS. 3A and 3B are schematic cross-sectional views of the optical device of the first embodiment.
Figure 3B:
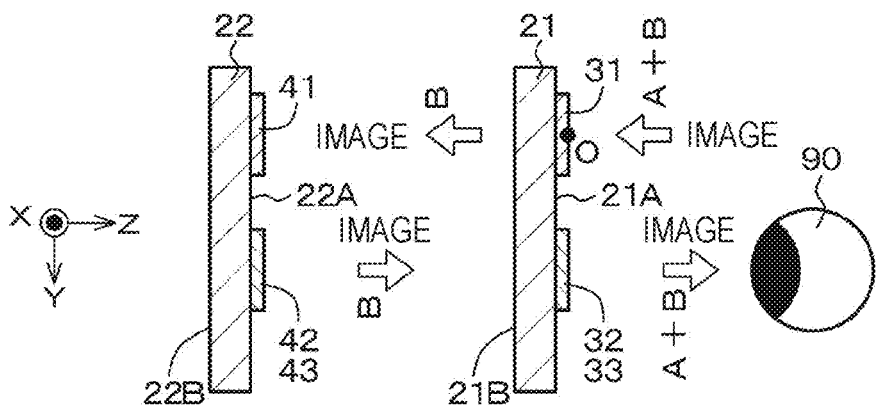
Figure 3C:
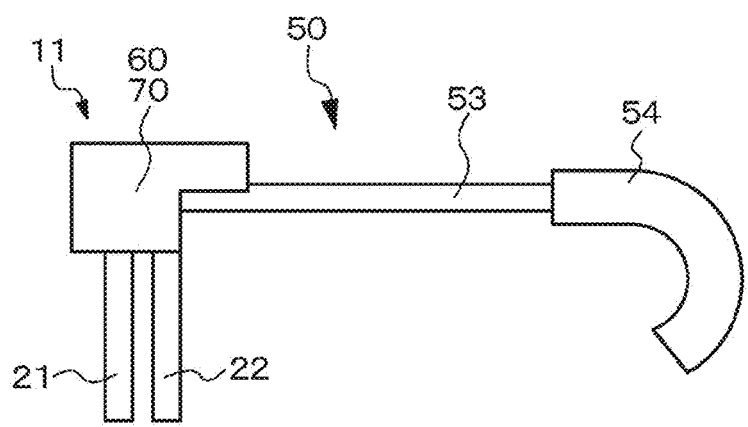
FIG. 3C is a schematic view of the optical device as viewed from a side.
Figure 4:
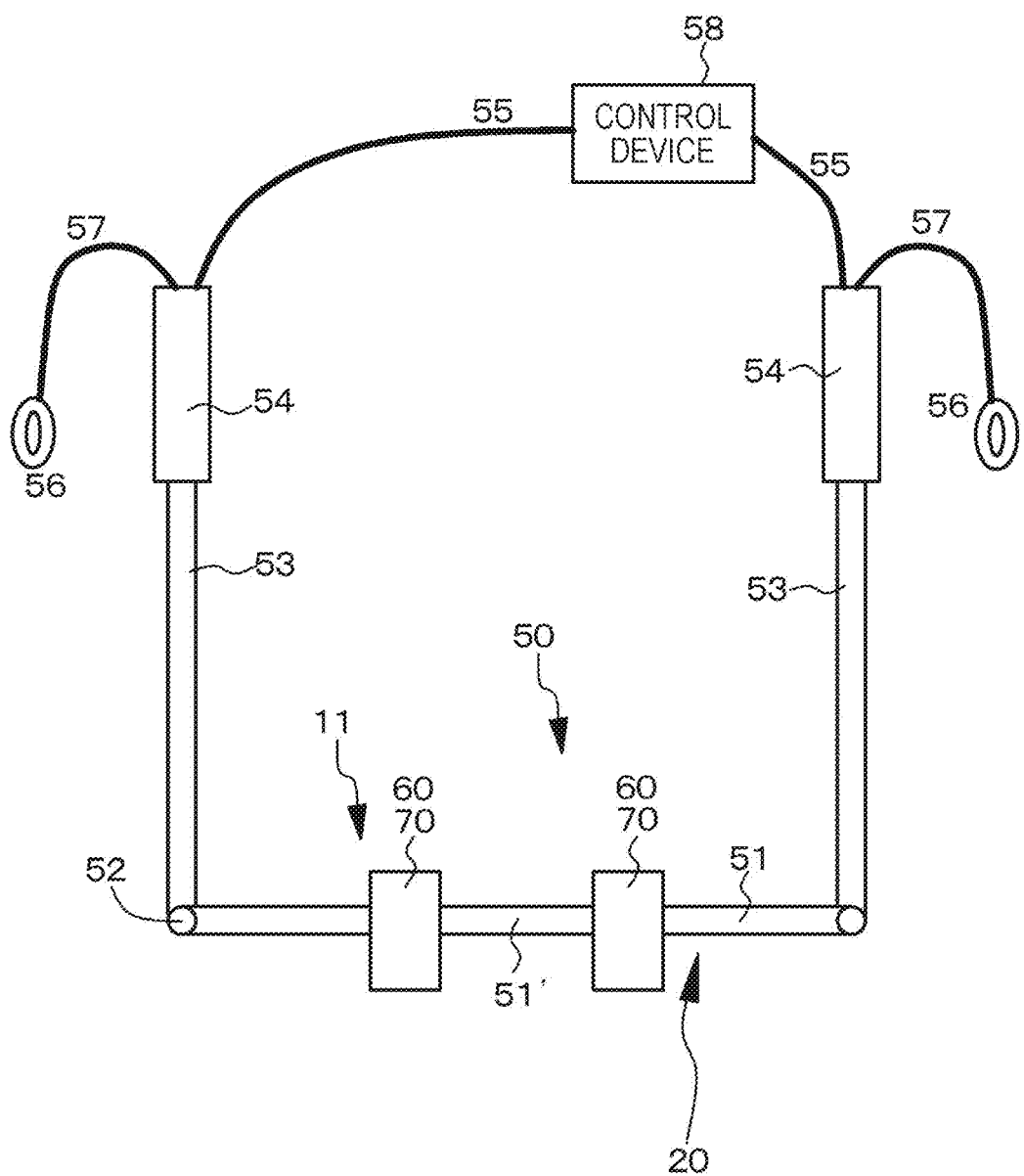
FIG. 4 is a schematic view of the optical device of the first embodiment as viewed from above.
Figure 5:
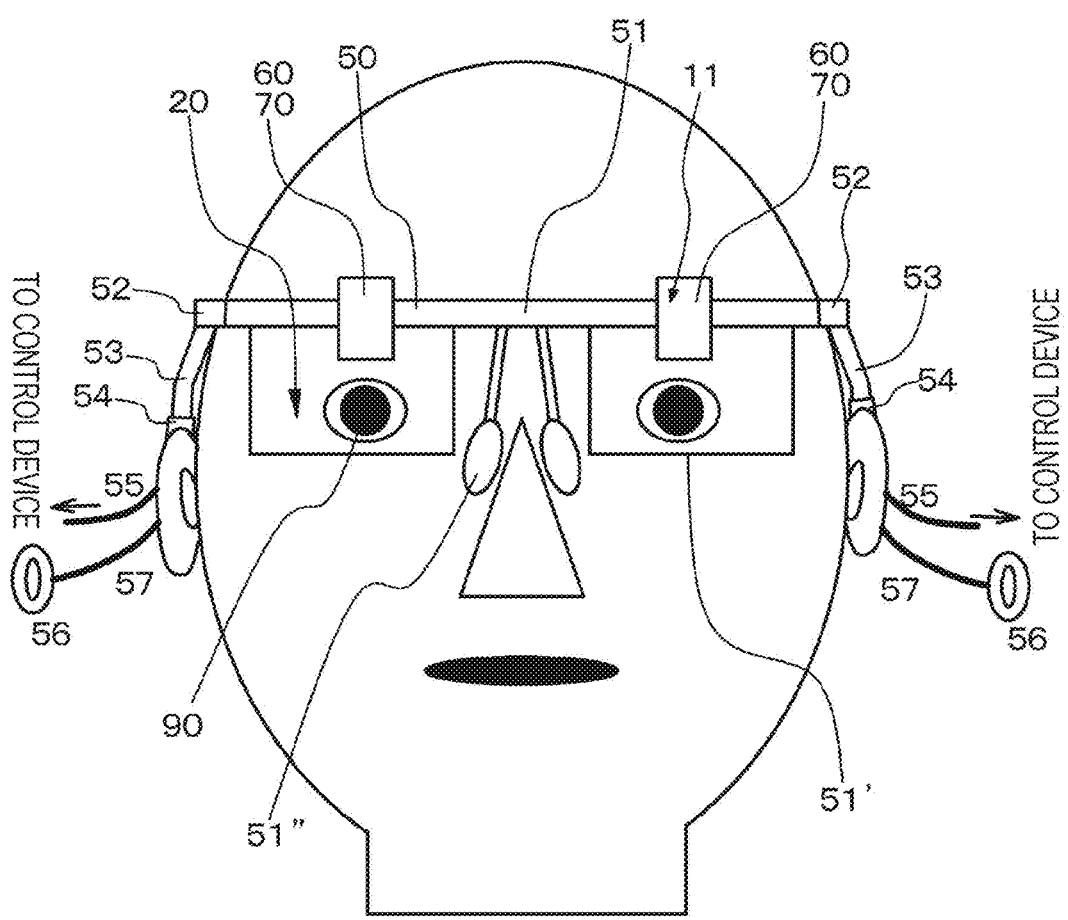
FIG. 5 is a schematic view of a display device of the first embodiment as viewed from front.
Figure 6A:
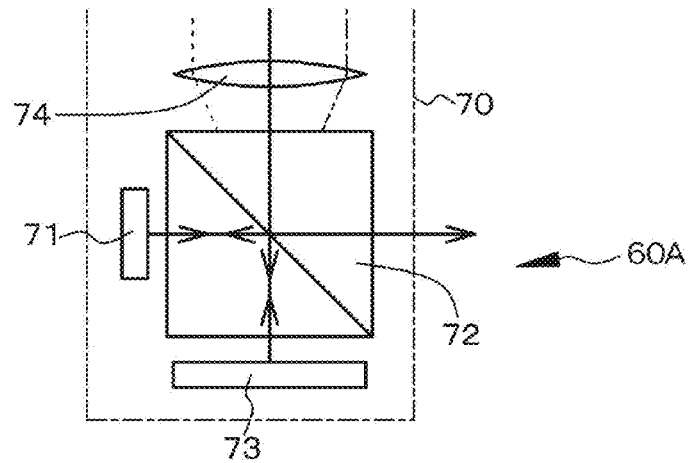
FIGS. 6A, 6B, and 6C are conceptual views of an image formation device in the display device of the first embodiment.
Figure 6B:
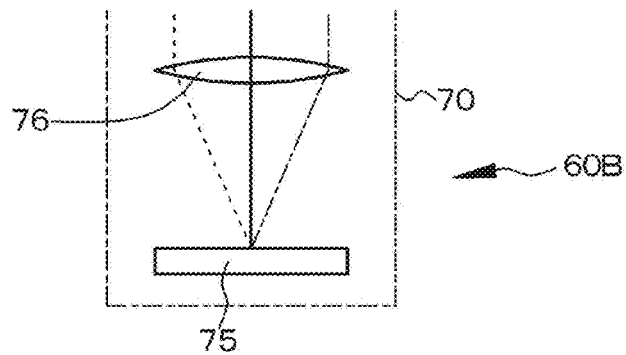
Figure 6C:
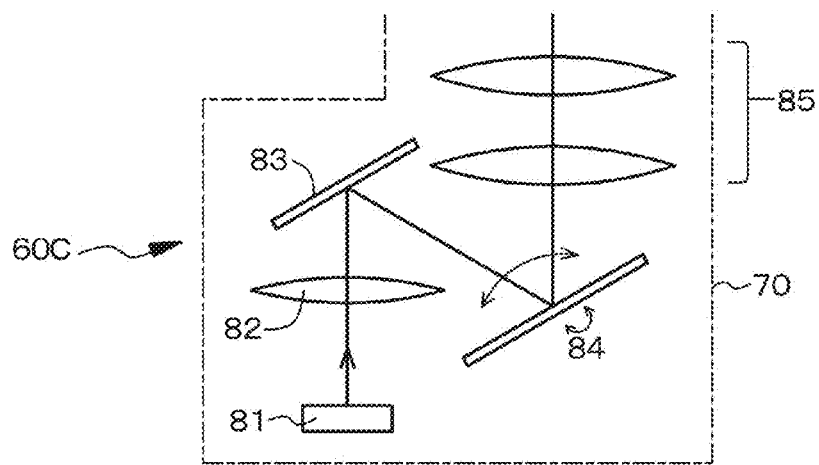

A first embodiment relates to an optical device of the present disclosure, an image display device of the present disclosure, and a display device of the present disclosure. A schematic view of a first light guide plate and a first deflection unit constituting the optical device of the first embodiment is illustrated in FIG. 1A, and a schematic view of a second light guide plate and a second deflection unit is illustrated in FIG. 1B. Furthermore, a schematic view of an arrangement of a first A deflection member, a first B deflection member, and a first C deflection member constituting the optical device of the first embodiment is illustrated in FIG. 2A, and a conceptual diagram of wave vectors and the like of the first A deflection member, the first B deflection member, and the first C deflection member is illustrated in FIG. 2B. Moreover, schematic cross-sectional views of the optical device of the first embodiment is illustrated in FIGS. 3A and 3B, a schematic view of the optical device as viewed from a side is illustrated in FIG. 3C, a schematic view of the optical device of the first embodiment as viewed from above is illustrated in FIG. 4, a schematic view of the display device of the first embodiment as viewed from front is illustrated in FIG. 5, and conceptual views of the image formation device in the display device of the first embodiment is illustrated in FIGS. 6A, 6B, and 6C. Note that FIGS. 1A, 1B, 8A, 8B, 10A, 10B, 12A, and 12B are conceptual views of the optical device constituting the image display device for the right eye as viewed from front, in which the observer's nose is located on right-hand sides of the diagrams, and the observer's ear is located on left-hand sides of the diagrams.

The optical device 10 of the first embodiment is an optical device in which a light emitted from an image formation device 60 is incident, guided, and emitted, the optical device including a first light guide plate 21 and a second light guide plate 22, and a first deflection unit 30 provided on the first light guide plate 21 and a second deflection unit 40 provided on the second light guide plate 22, the first deflection unit 30 includes a first A deflection member 31, a first B deflection member 32, and a first C deflection member 33, and the second deflection unit 40 includes a second A deflection member 41, a second B deflection member 42, and a second C deflection member 43.

Then, a part of the light emitted from the image formation device 60 is incident on the first A deflection member 31, a light incident on the first A deflection member 31 is deflected by the first A deflection member 31, totally reflected inside the first light guide plate 21 and incident on the first B deflection member 32, deflected by the first B deflection member 32, totally reflected inside the first light guide plate 21 and incident on the first C deflection member 33, deflected by the first C deflection member 33, and emitted toward a pupil 90 of an observer.

Furthermore, at least a rest of the light emitted from the image formation device 60 is incident on the second A deflection member 41, a light incident on the second A deflection member 41 is deflected by the second A deflection member 41, totally reflected inside the second light guide plate 22 and incident on the second B deflection member 42, deflected by the second B deflection member 42, totally reflected inside the second light guide plate 22 and incident on the second C deflection member 43, deflected by the second C deflection member 43, and emitted toward the pupil 90 of the observer.

Then, the direction when a direction in which a propagation direction of a light deflected by the first B deflection member 32 in the first light guide plate 21 is orthogonally projected onto the first light guide plate 21 is a first direction, and a direction in which a propagation direction of a light deflected by the second B deflection member 42 in the second light guide plate 22 is orthogonally projected onto the first light guide plate 21 is a second direction, the first direction is opposite to the second direction. Note that the first direction and the second direction are not parallel to each other. However, it is not limited to such a state, and in some cases, the first direction and the second direction can be in the same straight line.

Furthermore, the image display device 11 of the first embodiment includes:

an image formation device 60; and an optical device in which a light emitted from the image formation device 60 is incident, guided, and emitted, in which the optical device includes the optical device 10 of the first embodiment.

Moreover, the display device of the first embodiment includes:

a frame 50 attached to a head of an observer; and an Image display device 11 attached to the frame 50, in which the image display device 11 includes an image formation device 60 and an optical device in which a light emitted from the image formation device 60 is incident, guided, and emitted, and the optical device includes the optical device 10 of the first embodiment.

Then, in the optical device of the first embodiment, the first light guide plate 21 and the second light guide plate 22 are juxtaposed. That is, the first light guide plate 21 and the second light guide plate 22 are arranged in parallel separately with, for example, an air layer interposed therebetween.

Specifically, the display device of the first embodiment is a binocular type having two image display devices 11, but a single-eye type having one may be used. The optical device 10 is a see-through type (semi-transmissive type). Furthermore, the image formation device 60 displays a monochromatic image but it not limited to this. An image display device for the right eye will be described below on the basis of coordinate axes of a right hand system, but for an image display device for the left eye, it is only required to be read as coordinate axes of a left hand system.

In the optical device 10 of the first embodiment, a point on the first light guide plate 21 where a light beam emitted from an image formation area center point of the image formation device 60 collides with the first light guide plate 21 is an origin O, in an XYZ Cartesian coordinate system passing through the origin O, when an axis including a bisector toward a first direction is a +X axis, the bisector being of a sharp intersection angle within an intersection angle between a straight line passing through the origin O and parallel to the first direction and a straight line passing through the origin O and parallel to the second direction intersect, an axis that passes through the origin O and is perpendicular to the first light guide plate 21 is a Z axis, and an axis orthogonal to an X axis and the Z axis is a Y axis, the first deflection unit 30 and the second deflection unit 40 are arranged at positions symmetrical with respect to a YZ plane. As will be described later, a mode may be employed in which the light beam emitted from the image formation area center point of the image formation device 60 is vertically incident on the first A deflection member 31 and the second A deflection member 41, or as described later, a mode may be employed in which it is incident at a certain angle. Furthermore, it is assumed that the light beam emitted from the image formation area center point of the image formation device 60 is incident on the center of the pupil of the observer.

The first direction, which is a direction in which the propagation direction of the light deflected by the first B deflection member 32 in the first light guide plate 21 is orthogonally projected onto the first light guide plate 21, extends in a +X axis direction. However, it extends non-parallel to the +X axis. Furthermore, the second direction, which is a direction in which the propagation direction of the light deflected by the second B deflection member 42 in the second light guide plate 22 is orthogonally projected onto the first light guide plate 21, extends in a -X axis direction. However, it extends non-parallel to the -X axis. When a plane including a line of sight ("observer's horizontal line of sight") when the observer looks at an object located in a horizontal direction (for example, a horizontal object, an object at infinity, or a horizon or sea horizon) and including the two pupils of the observer located horizontally is assumed as a "horizontal plane", and a plane perpendicular to this horizontal plane is assumed as a "vertical plane", the +X axis and the -X axis are located in the horizontal plane in the first embodiment.

Here, a $(x_0, y_0, z_0)$ Cartesian coordinate system centered on the origin O is assumed. The $x_0$ axis is an axis parallel to a pupillary axis passing through the center of the pupil 90 of the observer. The $z_0$ axis is in an XZ plane, and the $y_0$ axis is orthogonal to the $x_0$ and $y_0$ axes. A "+" direction of the $x_0$ axis is a direction away from the observer. A "+" direction of the $z_0$ axis is a direction from the observer's ear to the nose. Here, the "pupillary axis" is defined as a line that passes through the center of the entrance pupil of an eye and is perpendicular to the surface of the cornea.

Figure 22A:
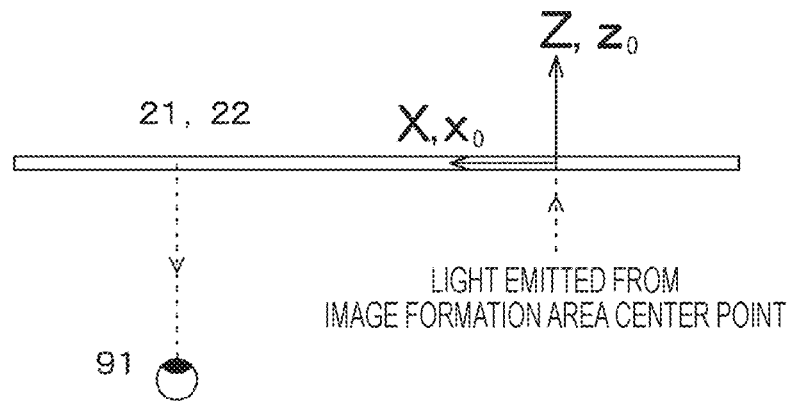
FIGS. 22A, 22B, and 22C are diagrams for explaining an XYZ Cartesian coordinate system and a $(x_0, y_0, z_0)$ Cartesian coordinate system.

As described above, as illustrated in FIG. 22A, the first light guide plate 21 and the second light guide plate 22 may be arranged so that the X axis coincides with the $x_0$ axis and the Z axis coincides with the $z_0$ axis. Note that in FIGS. 22A, 22B, and 22C, the light beam emitted from the image formation area center point of the image formation device 60 is illustrated by a dotted line, the pupillary axis is illustrated by an alternate long and short dash line, and these diagrams are for the image display device for the right eye.

Figure 22B:
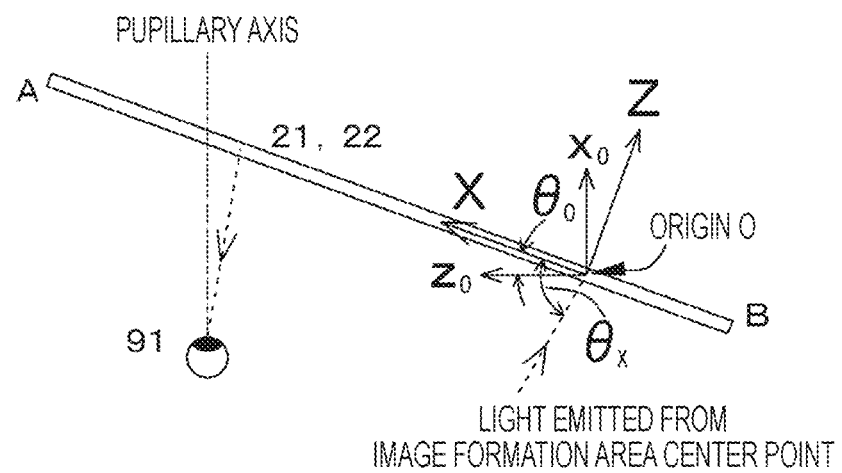
Figure 22C:
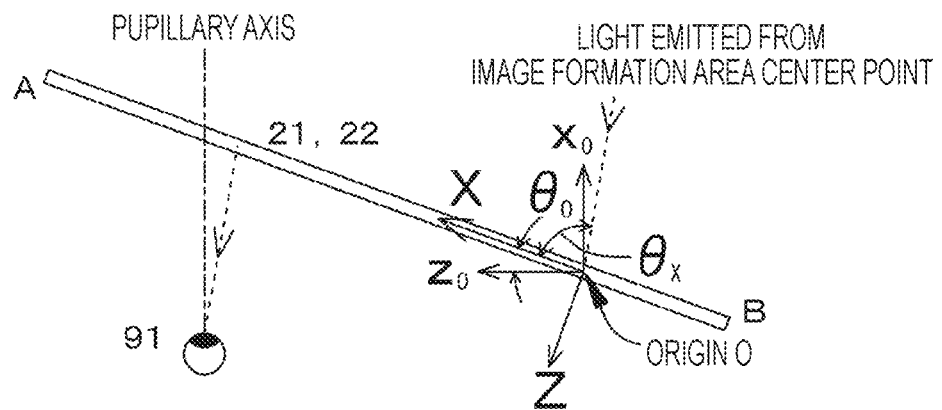

Alternatively, as illustrated in FIGS. 22B and 22C, an end A of the first light guide plate 21 and the second light guide plate 22 located on the nasal side of the observer may be arranged so as to be located more forward than an end B located on the ear side of the observer. In this case, an angle $\theta_0$ formed by the X axis and the $z_0$ axis is a value exceeding 0 degrees ($\theta_0 > 0$). Specifically, the value of $\theta_0$ preferably satisfies 0 (degrees)<$\theta_0$≤20 (degrees). Furthermore, when the angle formed by the X axis and the Y axis when the light beam emitted from the image formation area center point of the image formation device 60 is incident on the origin O is ($\theta_X$, $\theta_Y$), that is, an angle formed by an orthogonal projection image and the X axis when the light beam emitted from the image formation area center point of the image formation device and incident on the origin O is orthogonally projected onto the first light guide plate 21 (XZ plane) is $\theta_X$, and an angle formed by an orthogonal projection image and the Y axis when the light beam emitted from the image formation area center point of the image formation device and incident on the origin O is orthogonally projected onto the YZ plane is $\theta_Y$, in a case where the light beam emitted from the image formation area center point of the image formation device enters the light guide plate from the observer side (see FIG. 22B), it is preferable to satisfy 70 (degrees)≤$\theta_X$<90 (degrees), and -20 (degrees)≤$\theta_Y$≤20 (degrees).

Furthermore, in a case where the light beam emitted from the image formation area center point of the image formation device is incident on the light guide plate from the side opposite to the observer (see FIG. 22C), it is preferable to satisfy 70 (degrees)≤$\theta_X$<90 (degrees), and -20 (degrees)≤$\theta_Y$≤20 (degrees).

The relationship between $\theta_0$ and $\theta_X$ is preferably $\theta_0 \geq (90 - \theta_X)$. That is, it is desirable that the angle ($\theta_X$) formed by the orthogonal projection image and the X axis when the light beam emitted from the image formation area center point of the image formation device and incident on the origin O is orthogonally projected onto the first light guide plate 21 (XZ plane) is less than 90 degrees, more desirably equal to or more than 70 degrees and less than 90 degrees. Furthermore, it is desirable that the angle ($\theta_Y$) formed by the orthogonal projection image and the Y axis when the light beam emitted from the image formation area center point of the image formation device and incident on the origin O is orthogonally projected onto the YZ plane is -20 degrees or more and 20 degrees or less.

In the illustrated example, the first A deflection member 31 and the second A deflection member 41 constituting the first deflection unit 30 and the second deflection unit 40 are arranged at positions symmetrical with respect to the YZ plane, and are symmetrical and have the same shape. Similarly, the first B deflection member 32 and the second B deflection member 42 are arranged at positions symmetrical with respect to the YZ plane, are symmetrical, and have the same shape, and the first C deflection member 33 and the second C deflection member 43 are arranged at positions symmetrical with respect to the YZ plane, are symmetrical, and have the same shape. Specifically, for example, it is possible to employ a configuration such that the first deflection unit 30 displays an image having a horizontal angle of view of 20 degrees to a horizontal angle of view of 0 degrees and a vertical angle of view of ±20 degrees, and the second deflection unit 40 displays an image having a horizontal angle of view of 0 degrees to a horizontal angle of view of -20 degrees and a vertical angle of view of ±20 degrees. That is, in the optical device of the first embodiment, specifically, half of the light emitted from the image formation device 60 is incident on the first A deflection member 31, and the other half of the light emitted from the image formation device 60 is incident on the second A deflection member 41. An image with a horizontal angle of view in a positive direction corresponds to an image occupying the nose side of the observer, and an image with a horizontal angle of view in a negative direction is an image occupying the ear side of the observer.

However, it is not limited to this, and the first A deflection member 31 and the second A deflection member 41 constituting the first deflection unit 30 and the second deflection unit 40 can be arranged at positions symmetrical with respect to the YZ plane but have different shapes. Similarly, the first B deflection member 32 and the second B deflection member 42 can be arranged at positions symmetrical with respect to the YZ plane and have different shapes, and similarly, the first C deflection member 33 and the second C deflection member 43 can be arranged at positions symmetrical with respect to the YZ plane and have different shapes. Specifically, for example, it is possible to employ a configuration such that the first deflection unit 30 displays an image with a horizontal angle of view of 16 degrees to a horizontal angle of view of 0 degrees and a vertical angle of view of ±20 degrees, and the second deflection unit 40 displays an image with a horizontal angle of view of 0 degrees to a horizontal angle of view of −23 degrees and a vertical angle of view of ±20 degrees.

In the optical device 10 of the first embodiment, the first A deflection member 31, the first B deflection member 32, and the first C deflection member 33, and the second A deflection member 41, the second B deflection member 42, and the second C deflection member 43 each include a volume hologram diffraction grating. Here, as illustrated in FIG. 3A, the first light guide plate 21 has two parallel surfaces (first surface 21A and second surface 21B), and for example, the first surface 21A forms the light guide plate incident surface of the first light guide plate 21, and the second surface 21B forms the light guide plate emission surface of the first light guide plate 21. Furthermore, the second light guide plate 22 has two parallel surfaces (first surface 22A and second surface 22B), and for example, the first surface 22A forms the light guide plate incident surface of the second light guide plate 22, and the second surface 22B forms the light guide plate emission surface of the second light guide plate 22. Alternatively, as illustrated in FIG. 3B, the first light guide plate 21 has two parallel surfaces (first surface 21A and second surface 21B), and for example, the first surface 21A forms the light guide plate incident surface of the first light guide plate 21, and the second surface 21B forms the light guide plate emission surface of the first light guide plate 21. Furthermore, the second light guide plate 22 has two parallel surfaces (first surface 22A and second surface 22B), and for example, the first surface 22A forms the light guide plate incident surface of the second light guide plate 22, and the second surface 22B forms the light guide plate emission surface of the second light guide plate 22.

Then, the first A deflection member 31, the first B deflection member 32, the first C deflection member 33, the second A deflection member 41, the second B deflection member 42, and the second C deflection member 43, which each include a reflective type volume hologram diffraction grating, are arranged (specifically, bonded) on the second surfaces 21B and 22B or the first surfaces 21A and 22A of the first light guide plate 21 and the second light guide plate 22. The first A deflection member 31, the first B deflection member 32, the first C deflection member 33, the second A deflection member 41, the second B deflection member 42, and the second C deflection member 43 include one diffraction grating layer. Interference fringes corresponding to one type of wavelength band (or wavelength) are formed in each deflection member formed by a photopolymer material, and are manufactured by a conventional method. The pitch of the interference fringes formed on the deflection member (diffraction optical element) is constant, and the interference fringes are linear. The inclination angle (slant angle) of the interference fringes may be constant in the volume hologram diffraction grating, or may be changed depending on the value of the angle of view of an image incident on the volume hologram diffraction grating. In a case where the inclination angle of the interference fringes is changed depending on the value of the angle of view of the incident image, it may be changed continuously or stepwise.

In order for the light incident on the first A deflection member 31 and the second A deflection member 41 to be totally reflected inside the light guide plates 21, 22, the angle (incident angle) of the light that propagates inside the light guide plates 21, 22 and collides with the first surface 21A, 22A or the second surface 21B, 22B of the light guide plates 21, 22 with respect to the first surface 21A, 21B or the second surface 21B, 22B is demanded to be larger than the total reflection angle. Thus, for example, the angle of incidence of light on the first A deflection member 31 is necessary to satisfy $$k^v \cdot \sin(\theta_{in}) + m \cdot k^v_{1-A} = k^v \cdot \sin(\theta_{diff})$$

and moreover, $\theta_{diff}$ is demanded to be a value larger than the total reflection angle. Here, $k^v$ ... wave vector of incident light,
$\theta_{in}$ ... incident angle,
$\theta_{diff}$ ... diffraction angle, and
m ... order.

Figure 21:
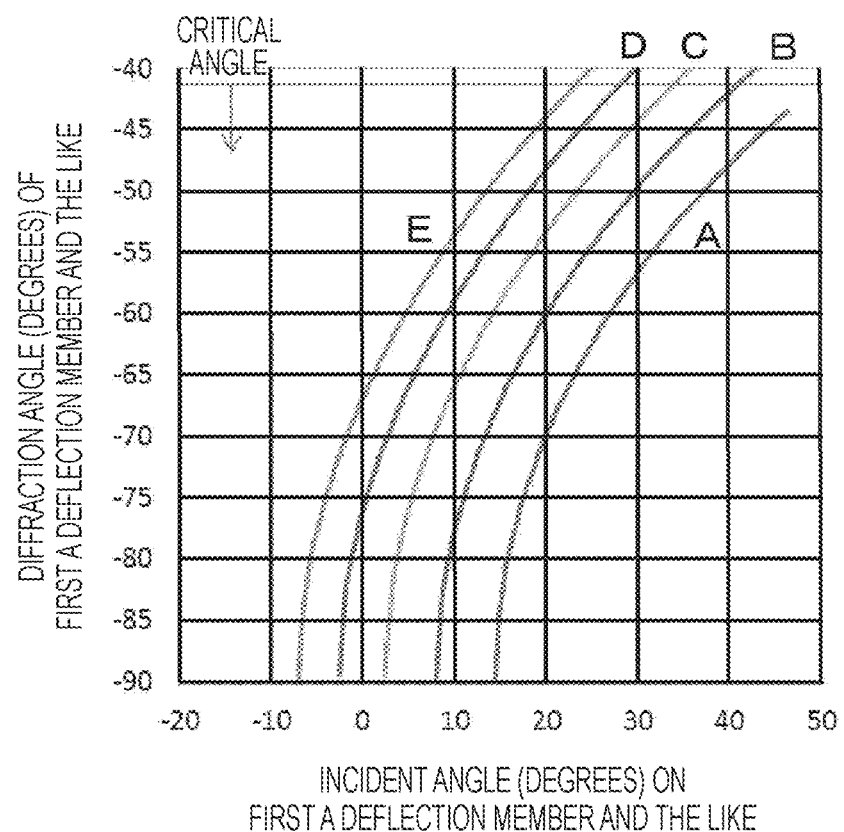
FIG. 21 is a graph illustrating a relationship between an incident angle of light on the first A deflection member or the second A deflection member and a diffraction angle of the first A deflection member or the second A deflection member with pitch d being a parameter.

The diffraction angle with respect to the angle of view of the image is defined by an equation that satisfies the Bragg condition described later, and is determined by a wavelength λ and a pitch d of the grating surface. A graph of FIG. 21 illustrates the relationship between an incident angle of light on the first A deflection member 31 or the second A deflection member 41 and a diffraction angle of the first A deflection member 31 or the second A deflection member 41, with the pitch d being a parameter. In FIG. 21, "A" indicates data with pitch d=300 nm, "B" indicates data with pitch d=320 nm, "C" indicates data with pitch d=340 nm, "D" indicates data with pitch d=360 nm, and "E" indicates data with pitch d=380 nm.

Incidentally, the diffraction angle $\theta_{diff}$ with respect to the angle of view of the image is expressed by the above-described equation. In a case of a transmissive type volume hologram diffraction grating, the value of m is preferably "−1" (−first order), and the incident angle of view corresponds to a diffraction angle of −90 degrees from the total reflection angle (see FIG. 21). The first A deflection member 31 and the second A deflection member 41 share the horizontal angle of view in the +X axis direction and the −X axis direction, respectively, but it is preferable that the horizontal angles of view that it is responsible for overlap. The graph of FIG. 21 illustrates the relationship between the pitch d and the diffraction angle in a case where the wavelength is 530 nm in the first A deflection member 31 or the second A deflection member 41. In this case, it is preferable to select a pitch in which the incident horizontal angles of view overlap, such as "D" and "E", with 0 degrees being the boundary. The larger the overlapping incident angles, the narrower the horizontal angle of view that can reach the pupil. However, it is only required to set the width of the deflection member to be equal to the pitch of total reflection, and in this case, the width of the deflection member may be set in consideration of wavelength dispersibility of the light source. For example, when the thickness of a light guide plate is T and the pitch of total reflection of light totally reflected inside the light guide plate is $Pt_{ir}$, the width of the deflection member (specifically, the width of the first A deflection member 31 along the +X axis direction and the width of the second A deflection member 41 along the −X axis direction) is only required to be set to satisfy an equation, width of deflection member=$Pt_{ir}$=2·T·tan($\theta_{diff}$). For example, in a case where a wavelength half width of a light source including LEDs is 30 nm, it is preferable that the range of 500 nm to 560 nm is calculated and the minimum width of the deflection member is set, or the maximum angle of the diffraction angle $\theta_{diff}$ is set.

Here, it is preferable that all lights deflected by the first A deflection member 31 are incident on the first B deflection member 32,
all lights deflected by the first B deflection member 32 are incident on the first C deflection member 33, all lights deflected by the second A deflection member 41 are incident on the second B deflection member 42, and all lights deflected by the second B deflection member 42 are incident on the second C deflection member 43. However, light loss on the light guide plates 21 and 22 is excluded.

The light propagates inside the light guide plates 21 and 22 by total reflection from the first A deflection member and the like toward the first B deflection member and the like, and thus the image incident on the light guide plates 21 and 22 is extended (enlarged) in the Y axis direction. Furthermore, the light propagates inside the light guide plates 21 and 22 by total reflection from the first B deflection member and the like toward the first C deflection member and the like, and thus the image extended (enlarged) in the Y axis direction is further extended in the +X axis direction and the −X axis direction. In this manner, the image from the image formation device 60 is stretched (enlarged) in the vertical and horizontal directions and reaches the pupil 90 of the observer. Furthermore, the parallel light from the image formation device 60 is diffracted by the first A deflection member and the like and the first B deflection member and the like (specifically, diffracted and reflected multiple times), propagates inside the light guide plates 21 and 22 by total reflection, and is emitted as a parallel light as it is from the second surface 22 from the light guide plates 21 and 22.

Surfaces of the first A deflection member and the like, the first B deflection member and the like, and the first C deflection member and the like, which does not oppose the light guide plate 20, may be covered with a transparent resin plate or a transparent resin film, so as to have a structure preventing damage to the first A deflection member and the like, the first B deflection member and the like, and the first C deflection member and the like. Furthermore, a transparent protective film may be attached to the first surface 21 or the second surface 22 of the light guide plate 20 to protect the light guide plate 20.

In the illustrated example, planar shapes of the first A deflection member and the like and the first C deflection member and the like are rectangular, and a planar shape of the first B deflection member and the like is trapezoidal. However, the planar shapes of these members are not limited to these. For example, the planar shape of the first A deflection member and the like may be circular, or the planar shape of the first B deflection member and the like may be rectangular. Planar shapes of the light guide plates 21 and 22 can also be a shape with notched corners.

The wavelength of the light (monochromatic) emitted from the image formation device 60 was set to $\lambda_0 = 530$ nm. Furthermore, materials constituting the light guide plates 21 and 22 are glass with a thickness of 1.0 mm (with a refractive index of 1.51), and an average refractive index of the photopolymer material constituting the first A deflection member and the like, the first B deflection member and the like, and the first C deflection member and the like is 1.51. Note that although the thicknesses of the light guide plates 21 and 22 do not essentially contribute to widening of the angle of view of the displayed image, by reducing the thickness of the light guide plates 21 and 22, the size of the first A deflection member and the like can be reduced and the parallel light emitting optical system constituting the image formation device 60 can be miniaturized, and by increasing the thickness of the light guide plates 21 and 22, the number of total reflections on the light guide plates 21 and 22 can be decreased and scattering on the reflecting surface can be suppressed, and a high-quality image can be projected. Thus, it is necessary to select the light guide plates 21 and 22 having optimum thicknesses.

Hereinafter, the arrangement of the first A deflection member 31, the first B deflection member 32, and the first C deflection member 33 constituting the first deflection unit 30 will be described, but the arrangement of the second A deflection member 41, the second B deflection member 42, and the second C deflection member 43 constituting the second deflection unit 40 can be similar to that of the first deflection unit 30 except different orientations. Furthermore, as described above, the image display device for the right eye will be described below on the basis of the coordinate axes of the right hand system.

Here, interference fringes having an inclination angle (slant angle) $\Phi$ are formed on the volume hologram diffraction grating. The inclination angle $\Phi$ refers to an angle formed by the surface of the volume hologram diffraction grating and the interference fringes. The interference fringes are formed from an inside of the volume hologram diffraction grating to the surface. The interference fringes satisfy the Bragg condition. The Bragg condition in a reflective type volume hologram diffraction grating refers to a condition that satisfies the following equation (A). In equation (A), m means a positive integer, $\lambda$ means a wavelength, d means a pitch of a grating surface (interval in a normal direction of a virtual plane including the interference fringes), and $\Theta$ is a margin of an angle of incidence on the interference fringes. Furthermore, the relationship between $\Theta$, an inclination angle $\Phi$, and an incident angle $\Psi$ in a case where a light enters the volume hologram diffraction grating at the incident angle $\Psi$ is as indicated in equation (B).

$$m \cdot \lambda = 2 \cdot d \cdot \sin(\Theta) \tag{A}$$

$$\Theta = 90° - (\Phi + \Psi) \tag{B}$$

Figure 8A:
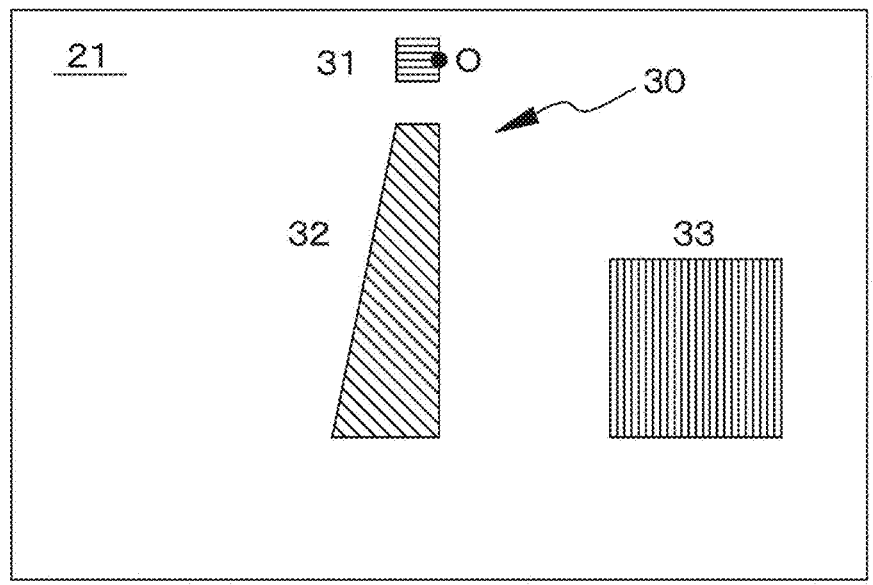
FIGS. 8A and 8B are schematic views illustrating an arrangement-first stage of the first light guide plate and the first deflection unit, and the second light guide plate and the second deflection unit constituting the optical device of the first embodiment.
Figure 8B:
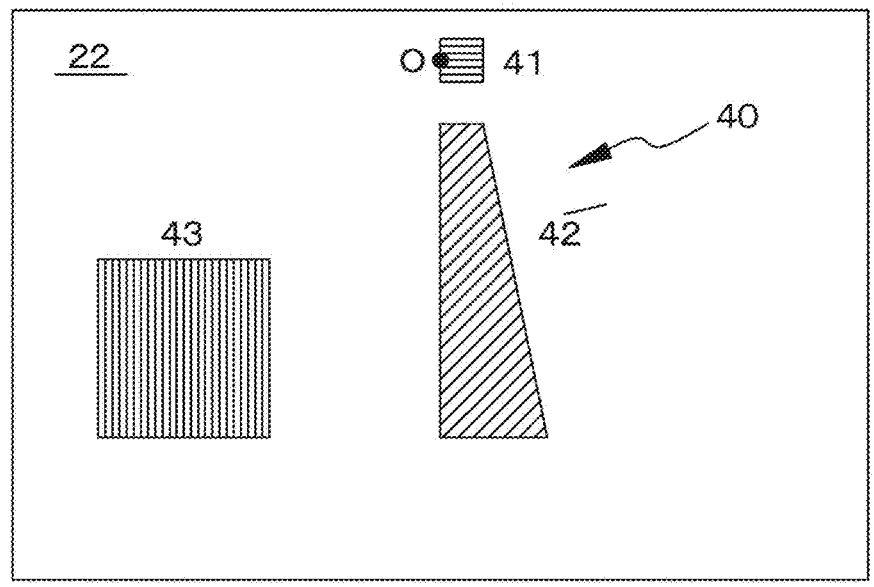
Figure 9A:
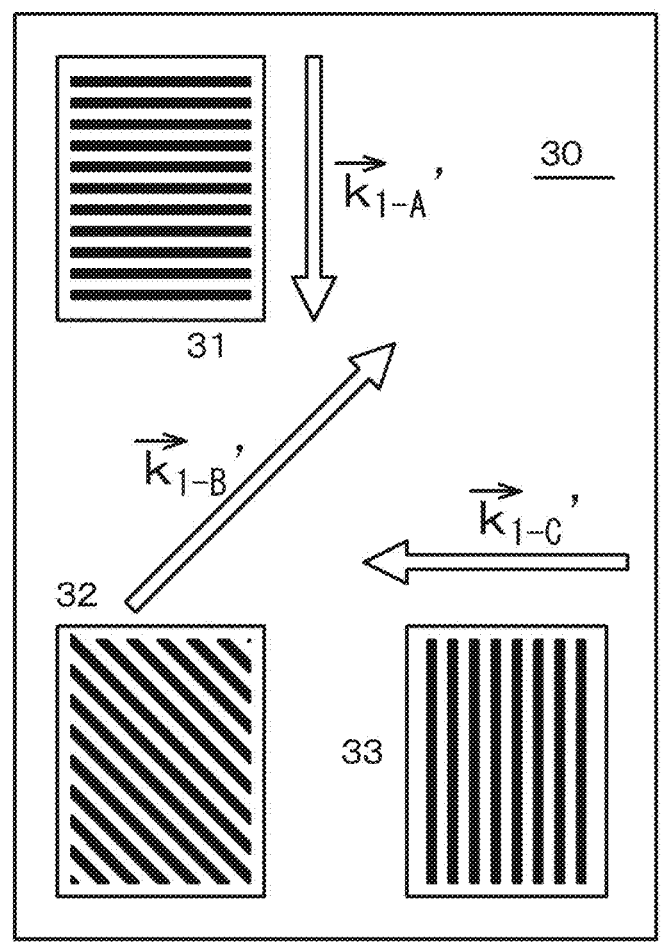
FIGS. 9A and 9B are a schematic view of the arrangement-first stage of the first A deflection member, the first B deflection member, and the first C deflection member constituting the optical device of the first embodiment, and a conceptual diagram of wave vectors and the like of the first A deflection member, the first B deflection member, and the first C deflection member in the arrangement-first stage, respectively.
Figure 9B:
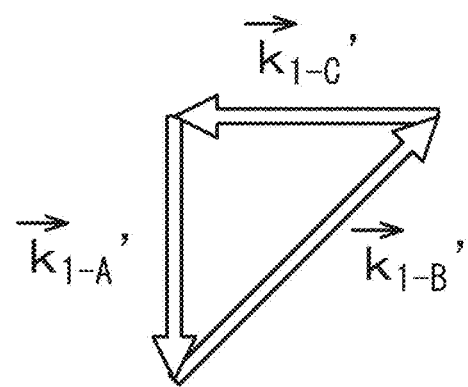

FIGS. 8A and 8B are schematic views illustrating an arrangement-first stage of the first A deflection member 31, the first B deflection member 32, and the first C deflection member 33 constituting the first deflection unit 30, and the second A deflection member 41, the second B deflection member 42, and second C deflection member 43 constituting the second deflection unit 40. Furthermore, FIGS. 9A and 9B are a schematic view of the arrangement-first stage of the first A deflection member, the first B deflection member, and the first C deflection member constituting the optical device of the first embodiment, and a conceptual diagram of wave vectors and the like of the first A deflection member, the first B deflection member, and the first C deflection member in the arrangement-first stage, respectively.

In the arrangement-first stage, when a wave vector of the first A deflection member 31 is $k^v_{1-A}{}'$, X, Y, and Z components of $k^v_{1-A}{}'$ are $K^X_{1-A}{}'$, $k^Y_{1-A}{}'$, and $k^Z_{1-A}{}'$, a wave vector of the second A deflection member 41 is $k^v_{2-A}{}'$, and X, Y, and Z components of $k^v_{2-A}{}'$ are $k^X_{2-A}{}'$, $k^Y_{2-A}{}'$, and $k^Z_{2-A}{}'$, $$k^X_{1-A}{}' = = k^X_{2-A}{}' = 0,$$

$$K^Y_{1-A}{}' = k^Y_{2-A}{}' = 0, \text{ and}$$

$$k^Z_{1-A}{}' = k^Z_{2-A}{}'.$$

Furthermore, when a wave vector of the first C deflection member 33 is $k^v_{1-C}{}'$, X, Y, and Z components of $k^v_{1-C}{}'$ are $k^X_{1-C}{}'$, $k^Y_{1-C}{}'$, and $k^Z_{1-C}{}'$, a wave vector of the second C deflection member 43 is $k^v_{2-C}{}'$, and X, Y, and Z components of $k^v_{2-C}{}'$ are $k^X_{2-C}{}'$, $k^Y_{2-C}{}'$, and $k^Z_{2-C}{}'$, $k^X_{1-C}{}' = -k^X_{2-C}{}' = 0,$ $k^Y_{1-C}{}' = k^Y_{2-C}{}' = 0,$ and $k^Z_{1-C}{}' = k^Z_{2-C}{}'.$ Moreover, when a wave vector of the first B deflection member 32 is $k^v_{1-B}{}'$, X, Y, and Z components of $k^v_{1-B}{}'$ are $k^X_{1-B}{}'$, $k^Y_{1-B}{}'$, and $k^Z_{1-B}{}'$, a wave vector of the second B deflection member 42 is $k^v_{2-B}{}'$, and X, Y, and Z components of $k^v_{2-B}{}'$ are $k^X_{2-B}{}'$, $k^Y_{2-B}{}'$, and $k^Z_{2-B}{}'$, $k^X_{1-B}{}' = -k^X_{2-B}{}' = 0,$ $k^Y_{1-B}{}' = k^Y_{2-B}{}' = 0,$ and $k^Z_{1-B}{}' = k^Z_{2-C}{}'.$ Here, $k^v_{1-A}{}' + k^v_{1-B}{}' + k^v_{1-C}{}' = 0$ and $k^v_{2-A}{}' + k^v_{2-B}{}' + k^v_{2-C}{}' = 0$ are satisfied.

Figure 16A:
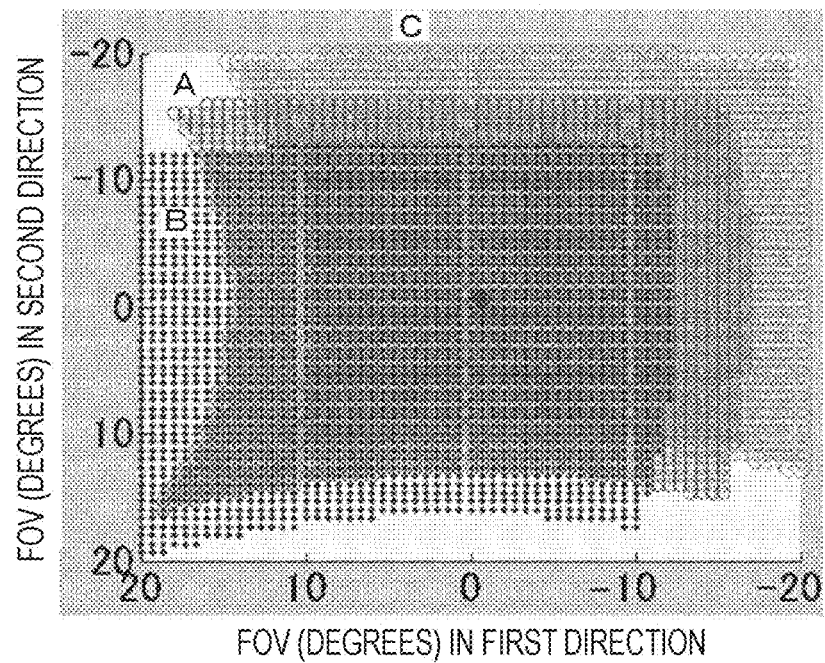
FIGS. 16A and 16B are diagrams illustrating results of simulating an image area obtained in the optical device of the first embodiment.
Figure 16B:
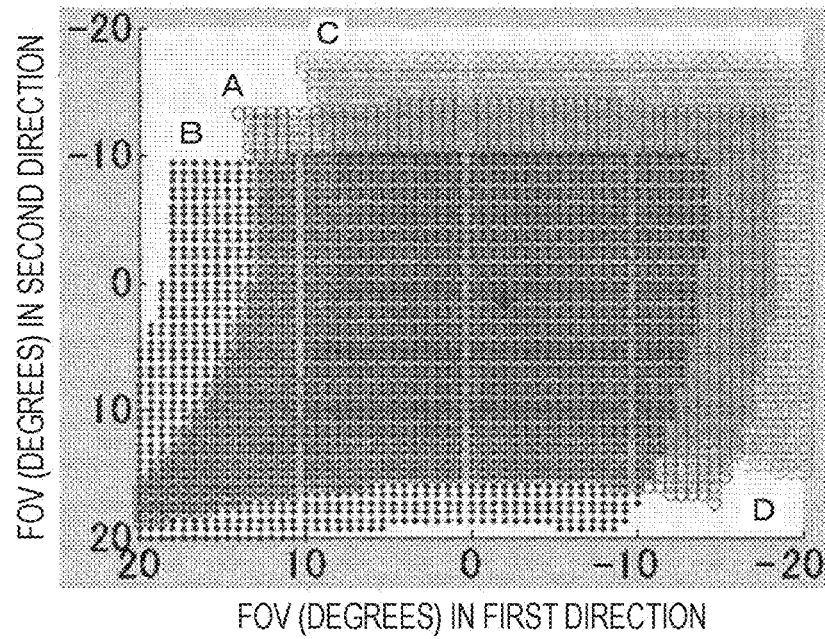
Figure 17:
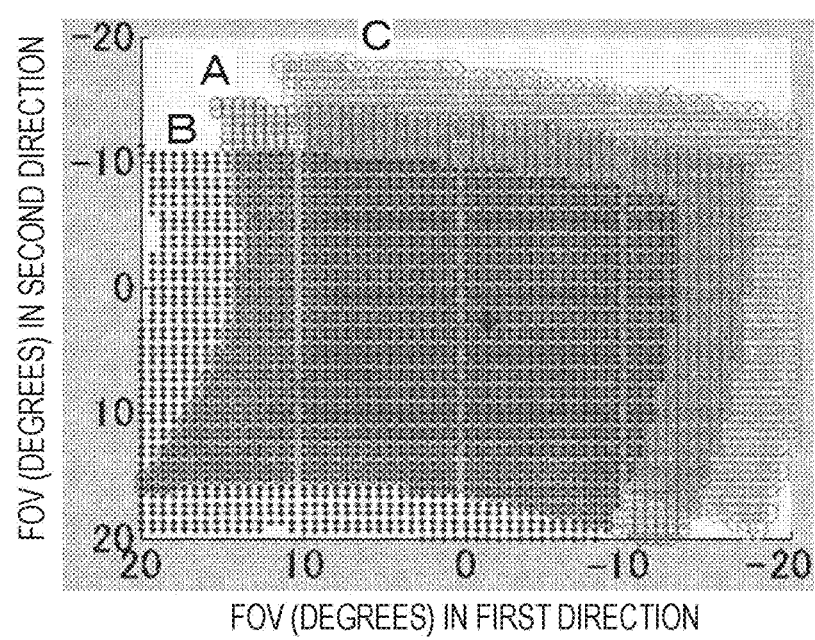
FIG. 17 is a diagram illustrating results of simulating the image area obtained in the optical device of the first embodiment.
Figure 18A:
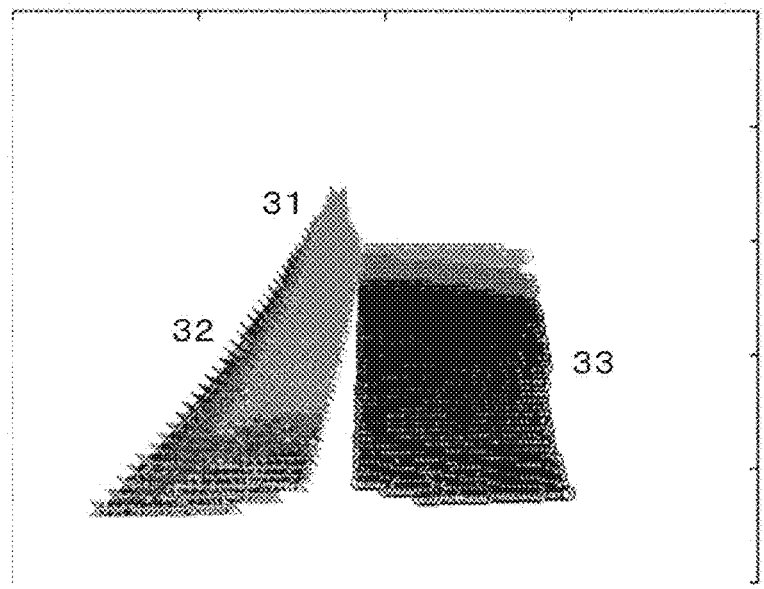
FIGS. 18A and 18B are diagrams illustrating results of simulating light propagation states in the first light guide plate and the second light guide plate obtained in the optical device of the first embodiment, respectively.
Figure 18B:
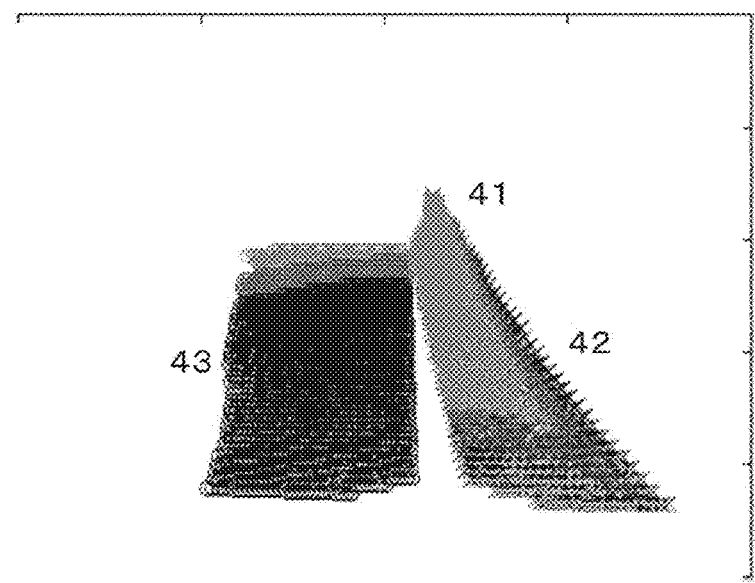

Results of simulating this state are illustrated in FIG. 16A. FIGS. 16A, 16B, and 17 are diagrams illustrating simulation results when the first A deflection member 31, the first B deflection member 32, and the first C deflection member 33 constituting the first deflection unit 30 are arranged in a state illustrated in FIG. 20, that is, the first A deflection member 31 and the second A deflection member 41 are arranged in a combined state, and the first B deflection member 32 and the second B deflection member 42 are arranged in a combined state. In FIGS. 16A, 16B, 17, 19A, and 19B illustrating the simulation results, "A" indicates an area of an image obtained by a light of a wavelength $\lambda_0$ having a peak intensity among lights emitted from a light source, "B" indicates an area of an image obtained by a wavelength ($\lambda_0$−10 nm) among the lights emitted from the light source, and "C" indicates an area of an image obtained by a wavelength ($\lambda_0$+10 nm) among the lights emitted from the light source. Furthermore, in FIGS. 16A, 16B, 17, 19A, and 19B, the horizontal axis is the value of field of view (FOV, viewing angle) in the Y axis direction, and the vertical axis is the value of FOV in the X axis direction. In FIGS. 18A and 18B, the horizontal axis indicates the position on the first light guide plate 21 in the ±X axis direction, and the vertical axis indicates the position on the first light guide plate 21 in the ±Y axis direction.

Figure 10A:
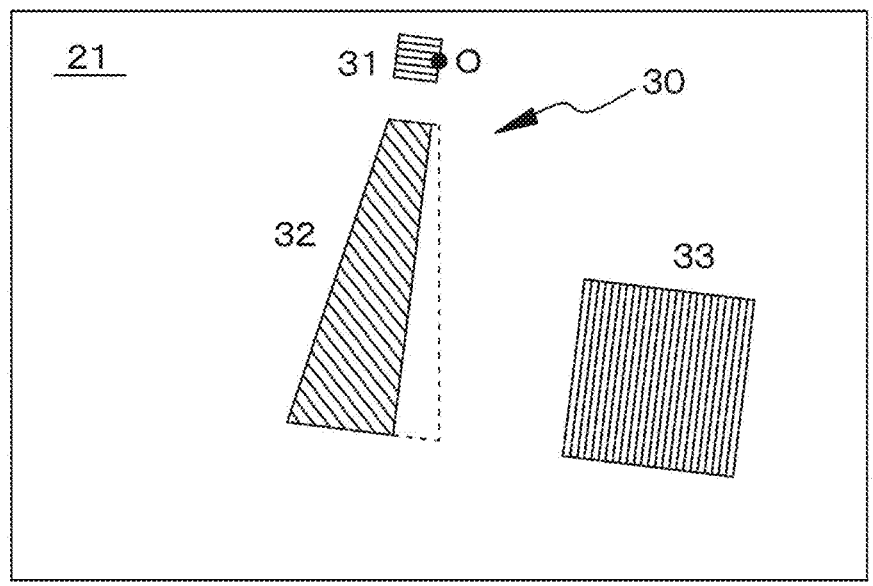
FIGS. 10A and 10B are schematic views illustrating an arrangement-second stage of the first light guide plate and the first deflection unit constituting the optical device of the first embodiment.
Figure 10B:
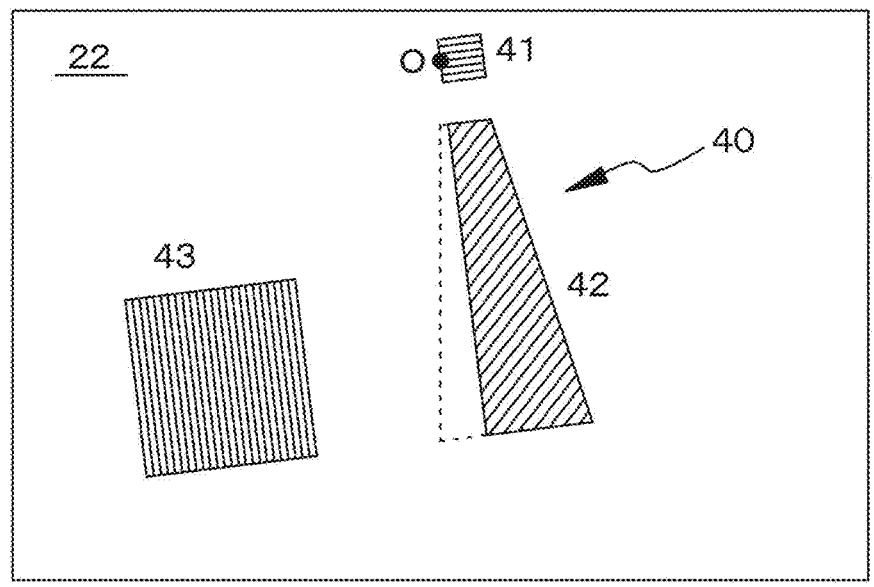
Figure 11A:
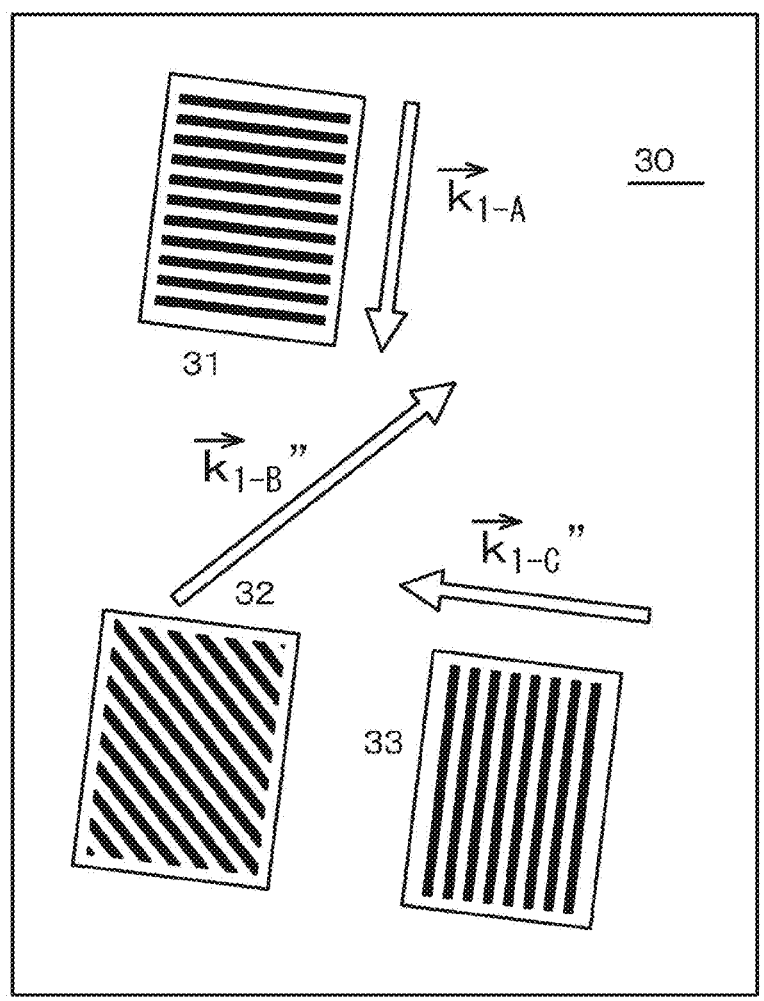
FIGS. 11A and 11B are schematic views of the arrangement-second stage of the first A deflection member, the first B deflection member, and the first C deflection member constituting the optical device of the first embodiment, and a conceptual diagram of wave vectors and the like of the first A deflection member, the first B deflection member, and the first C deflection member in the arrangement-second stage, respectively.
Figure 11B:
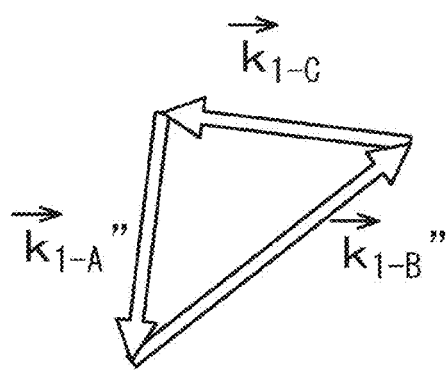

Schematic views illustrating an arrangement-second stage of the first A deflection member 31, the first B deflection member 32, and the first C deflection member 33 constituting the first deflection unit 30, and the second A deflection member 41, the second B deflection member 42, and the second C deflection member 43 constituting the second deflection unit 40 are illustrated in FIGS. 10A and 10B. Furthermore, a schematic view of the arrangement-second stage of the first A deflection member, the first B deflection member, and the first C deflection member constituting the optical device of the first embodiment, and a conceptual diagram of wave vectors and the like of the first A deflection member, the first B deflection member, and the first C deflection member in the arrangement-second stage are illustrated in FIGS. 11A and 11B.

In the arrangement-second stage, the first deflection unit 30 is arranged in a state of being rotated by, for example, 7 degrees in a first rotation direction in a clockwise direction with the origin O being the center. Furthermore, the second deflection unit 40 is arranged in a state of being rotated by, for example, 7 degrees in a second rotation direction in a counterclockwise direction (for example, −7 degrees in a clockwise direction) with the origin O being the center. Simulation results of an image obtained by such rotation are illustrated in FIG. 16B, and it can be seen that they move in the +X axis direction and the Y axis direction as compared with FIG. 16A. Note that instead of arranging the first deflection unit 30 in a state of being rotated by, for example, 7 degrees in the first rotation direction in the clockwise direction, the wave vectors of the first A deflection member 31, the first B deflection member 32, and the first C deflection member 33 constituting the first deflection unit 30 may be in a state of being rotated by, for example, 7 degrees in the first rotation direction in the clockwise direction. Furthermore, instead of arranging the second deflection unit 40 in a state of being rotated by, for example, 7 degrees in the second rotation direction in the counterclockwise direction (for example, −7 degrees in the clockwise direction), the wave vectors of the second A deflection member 41, the second B deflection member 42, and the second C deflection member 43 constituting the second deflection unit 40 may be in a state of being rotated by, for example, 7 degrees in the second rotation direction in the counterclockwise direction (for example, −7 degrees in the clockwise direction).

Note that in the arrangement-second stage, when a wave vector of the first A deflection member 31 is $k^v_{1-A}{}''$, X, Y, and Z components of $k^v_{1-A}{}''$ are $k^X_{1-A}{}''$, $k^Y_{1-A}{}''$, and $k^Z_{1-A}{}''$, a wave vector of the second A deflection member 41 is $k^v_{2-A}{}''$, and X, Y, and Z components of $k^v_{2-A}{}''$ are $k^X_{2-A}{}''$, $k^Y_{2-A}{}''$, and $k^Z_{2-A}{}''$, $k^X_{1-A}{}'' + k^X_{2-A}{}'' = 0,$ $k^Y_{1-A}{}'' = k^Y_{2-A}{}'',$ and $k^Z_{1-A}{}'' = k^Z_{2-A}{}''.$ Furthermore, when a wave vector of the first C deflection member 33 is $k^v_{1-C}{}''$, X, Y, and Z components of $k^v_{1-C}{}''$ are $k^X_{1-C}{}''$, $k^Y_{1-C}{}''$, and $k^Z_{1-C}{}''$, a wave vector of the second C deflection member 43 is $k^v_{2-C}{}''$, and X, Y, and Z components of $k^v_{2-C}{}''$ are $k^X_{2-C}{}''$, $k^Y_{2-C}{}''$, and $k^Z_{2-C}{}''$, $k^X_{1-C}{}'' + k^X_{2-C}{}'' = 0,$ $k^Y_{1-C}{}'' = k^Y_{2-C}{}'',$ and $k^Z_{1-C}{}'' = k^Z_{2-C}{}''.$ Moreover, when a wave vector of the first B deflection member 32 is $k^v_{1-B}{}''$, X, Y, and Z components of $k^v_{1-B}{}''$ are $k^X_{1-B}{}''$, $k^Y_{1-B}{}''$, and $k^Z_{1-B}{}''$, a wave vector of the second B deflection member 42 is $k^v_{2-B}{}''$, and X, Y, and Z components of $k^v_{2-B}{}''$ are $k^X_{2-B}{}''$, $k^Y_{2-B}{}''$, and $k^Z_{2-B}{}''$, $k^X_{1-B}{}'' + k^X_{2-B}{}'' = 0,$ $k^Y_{1-B}{}'' = k^Y_{2-B}{}'',$ and $k^Z_{1-B}{}'' = k^Z_{2-C}{}''.$ Here, $k^v_{1-A}{}'' + k^v_{1-B}{}'' + k^v_{1-C}{}'' = 0$ and $k^v_{2-A}{}'' + k^v_{2-B}{}'' + k^v_{2-C}{}'' = 0$ are satisfied.

That is, in the optical device of the first embodiment,
the first deflection unit 30 is arranged in a state of being rotated in the first rotation direction in the counterclockwise direction or the clockwise direction with the Z axis being the center. Furthermore, the second deflection unit 40 is arranged in a state of being rotated in the second rotation direction in the clockwise direction or the counterclockwise direction with the Z axis being the center. Furthermore, when a rotation angle in the first rotation direction is $\varphi_1$ and a rotation angle in the second rotation direction is $\varphi_2$ with reference to the +X axis, it is desirable that $|\varphi_1|=|\varphi_2|$, is satisfied, and also 0 (degrees)<$|\varphi_1|=|\varphi_2|$≤23 (degrees), preferably, 0 (degrees)<$|\varphi_1|=|\varphi_2|$≤16 (degrees)

are satisfied. Specifically, in the illustrated example, the first deflection unit 30 is arranged in a state of being rotated by $|\varphi_1|$=7 degrees (+7 degrees) in the first rotation direction in the clockwise direction with the origin O being the center, and the second deflection unit 40 is arranged in a state of being rotated by $|\varphi_2|$=7 degrees (−7 degrees) in the second rotation direction in the counterclockwise direction with the origin O being the center.

Incidentally, if the first deflection unit 30 illustrated in FIG. 8A is arranged in a state of being rotated by, for example, 7 degrees in the first rotation direction in the clockwise direction with the origin O being the center, and the second deflection unit 40 illustrated in FIG. 8B is arranged in a state of being rotated by, for example, 7 degrees in the second rotation direction in the counterclockwise direction (for example, −7 degrees in the clockwise direction) with the origin O being the center, states illustrated in FIGS. 10A and 10B are obtained, but in these states, a "missing part" occurs in the image in the Y axis and its vicinity. An area where the missing occurs in the image is illustrated by an area surrounded by a dotted line in FIGS. 10A and 10B.

Figure 12A:
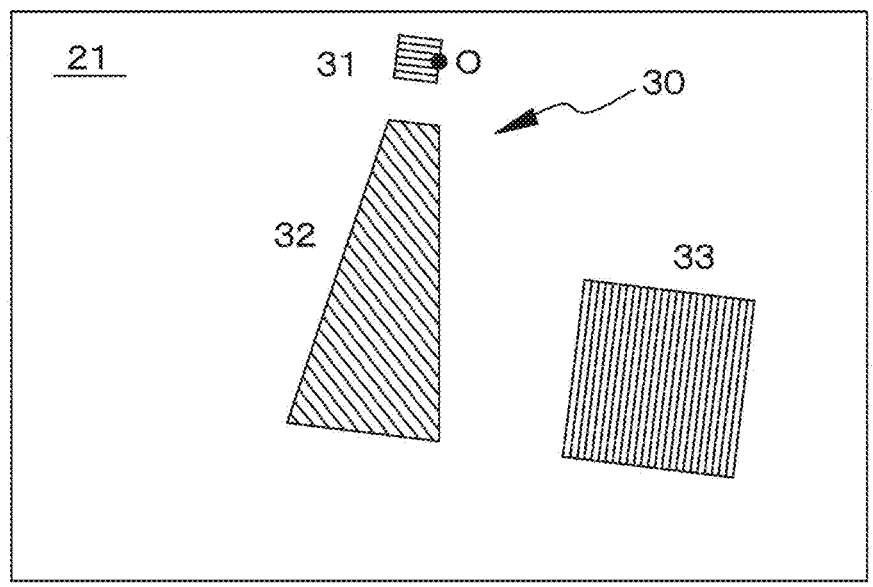
FIGS. 12A and 12B are schematic views illustrating the arrangement-second stage of the first light guide plate and the first deflection unit constituting the optical device of the first embodiment.
Figure 12B:
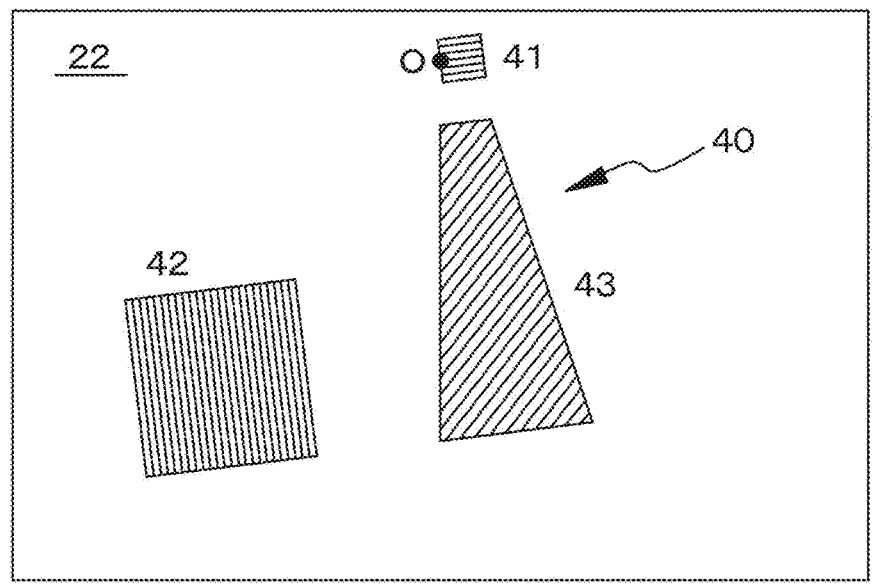

Therefore, in order to prevent such image missing, in each of the first B deflection member 32 and the second B deflection member 42, the first B deflection member orthogonal projection image when the first B deflection member 32 is orthogonally projected onto the first light guide plate 21, and the second B deflection member orthogonal projection image when the second B deflection member 42 is orthogonally projected onto the first light guide plate 21 are partially overlapped. Moreover, an end in the +X axis direction of the first B deflection member orthogonal projection image and an end in the −X axis direction of the second B deflection member orthogonal projection image are overlapped. Schematic views illustrating such arrangement-second stage of the first deflection unit constituting the optical device of the first embodiment are illustrated in FIGS. 12A and 12B, and in the illustrated example, the +X axis direction end of the first B deflection member orthogonal projection image and the −X axis direction end of the second B deflection member orthogonal projection image are in contact.

Schematic diagrams illustrating an arrangement-third stage of the first A deflection member 31, the first B deflection member 32, and the first C deflection member 33 constituting the first deflection unit 30, and the second A deflection member 41, the second B deflection member 42, and the second C deflection member 43 constituting the second deflection unit 40 are illustrated in FIGS. 1A and 1B. Furthermore, a schematic diagram of the arrangement-third stage of the first A deflection member, the first B deflection member, and the first C deflection member constituting the optical device of the first embodiment is illustrated in FIG. 2A, and a conceptual diagram of wave vectors and the like of the first A deflection member, the first B deflection member, and the first C deflection member in the arrangement-third stage is illustrated in FIG. 2B.

In the arrangement-third stage, when an angle formed by a direction of the light incident on the first B deflection member 32 (indicated by "$L_1$" in FIG. 1A) and a direction of a light emitted from the first B deflection member 32 (indicated by "$L_2$" in FIG. 1A) is $\psi_1$, an angle formed by a direction of the light incident on the second B deflection member 42 (indicated by "$L_3$" in FIG. 1A), and a direction of a light emitted from the second B deflection member 42 (indicated by "$L_4$" in FIG. 1A) is $\psi_2$, 90 degrees<$\psi_1$, and 90 degrees<$\psi_2$ are satisfied. Moreover, it is preferable that 90 degrees<$\psi_1$≤105 degrees, and 90 degrees<$\psi_2$≤105 degrees, preferably, 90 degrees<$\psi_1$≤100 degrees, and 90 degrees<$\psi_2$≤100 degrees are satisfied. Specifically, although not limited, it is preferable that 99.5 (degrees)≤$\psi_1=\psi_2$≤100.5 (degrees)

is satisfied.

Specifically, it is only required to rotate the first B deflection member 32 and the second B deflection member 42, so as to optimize the inclination angle (slant angle) Φ, the pitch d of the grating surface, and the margin Θ of an angle of incidence on the interference fringes in the first B deflection member 32 and the second B deflection member 42. Specifically, $\psi_1=\psi_2$=100 degrees. Furthermore, it is only required to rotate the first C deflection member 33 and the second C deflection member 43, so as to optimize the inclination angle (slant angle) Φ, the pitch d of the grating surface, and the margin Θ of an angle of incidence on the interference fringes in the first C deflection member 33 and the second C deflection member 43.

Figure 19A:
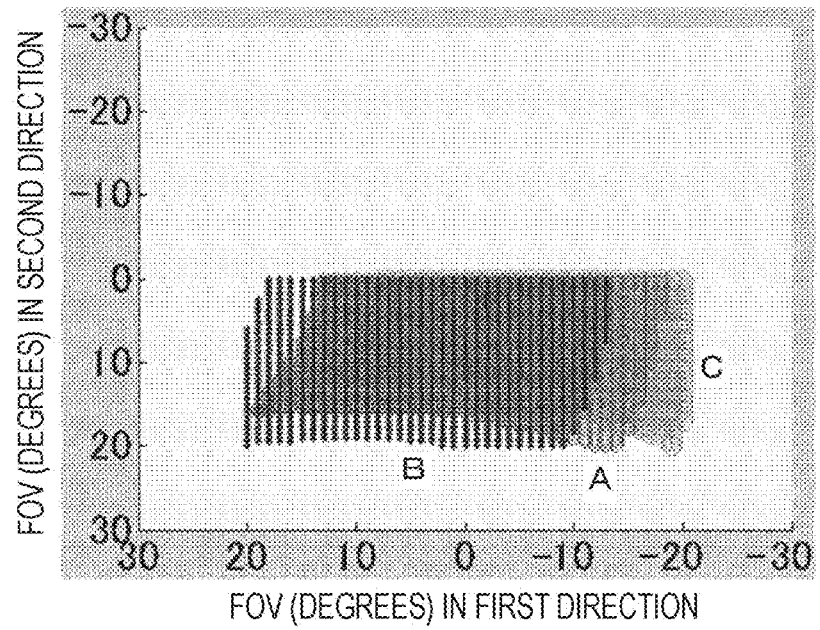
FIGS. 19A and 19B are diagrams illustrating results of simulating images obtained by the first deflection unit and the second deflection unit obtained in the optical device of the first embodiment, respectively.
Figure 19B:
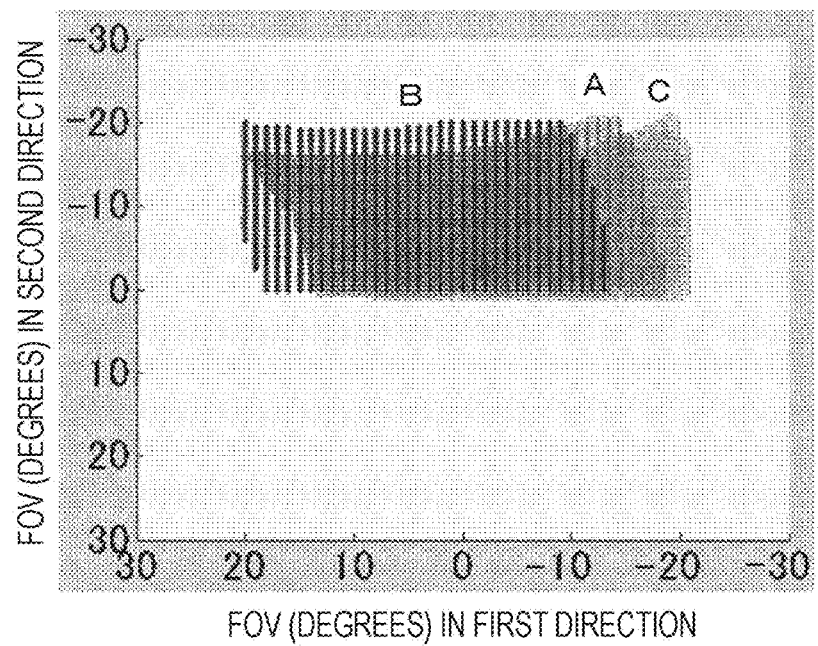
Figure 20:
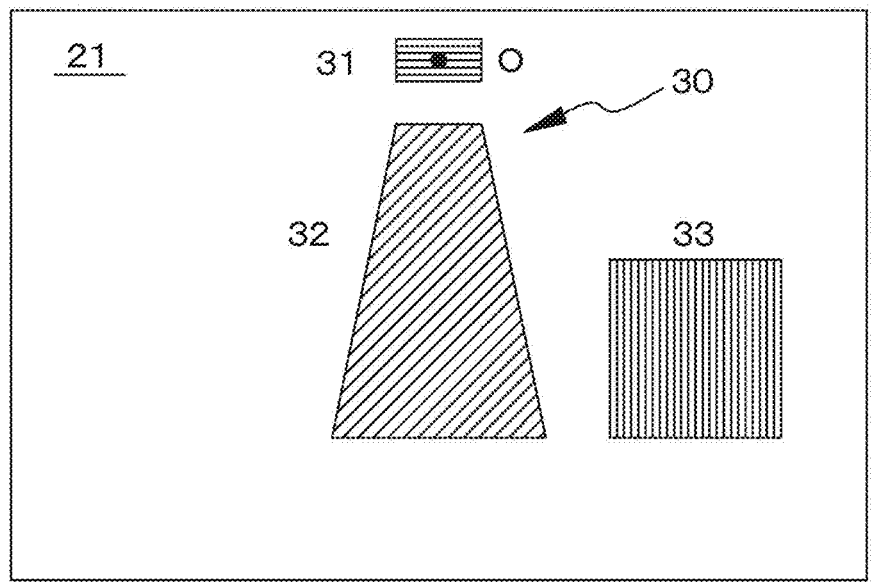
FIG. 20 is a schematic view illustrating an arrangement state of the first A deflection member, the first B deflection member, and the first C deflection member constituting the first deflection unit for obtaining results of simulations illustrating FIGS. 16A, 16B, and 17.

Simulation results of images obtained by such rotation of the deflection members 32, 42, 33, and 43 are illustrated in FIG. 17, in which it can be seen that the value of the FOV in the +X axis direction is wider compared to that in FIG. 16B, that is, the portion of the area (area D illustrated in white) in FIG. 16B is almost eliminated in FIG. 17. Simulation results of light propagation states in the first light guide plate 21 and the second light guide plate 22 obtained in the optical device of the first embodiment are illustrated in FIGS. 18A and 18B, and simulation results of images obtained by the first deflection unit 30 and the second deflection unit 40 illustrated in FIG. 1A are illustrated in FIGS. 19A and 19B.

Note that in the arrangement-third stage, when a wave vector of the first A deflection member 31 is $k^v_{1-A}$, X, Y, and Z components of $k^v_{1-A}$ are $k^X_{1-A}$, $k^Y_{1-A}$, and $k^Z_{1-A}$, a wave vector of the second A deflection member 41 is $k^v_{2-A}$, and X, Y, and Z components of $k^v_{2-A}$ are $k^X_{2-A}$, $k^Y_{2-A}$, and $k^Z_{2-A}$, $k^X_{1-A}+k^X_{2-A}=0$, $k^Y_{1-A}=k^Y_{2-A}$, and $k^Z_{1-A}=k^Z_{2-A}$.

Furthermore, when a wave vector of the first C deflection member 33 is $k^v{}_{1\text{-}C}$, X, Y, and Z components of $k^v{}_{1\text{-}C}$ are $k^X{}_{1\text{-}C}$, $k^Y{}_{1\text{-}C}$, and $k^Z{}_{1\text{-}C}$, a wave vector of the second C deflection member 43 is $k^v{}_{2\text{-}C}$, and X, Y, and Z components of $k^v{}_{2\text{-}C}$ are $k^X{}_{2\text{-}C}$, $k^Y{}_{2\text{-}C}$, and $k^Z{}_{2\text{-}C}$, $k^X{}_{1\text{-}C} + k^X{}_{2\text{-}C} = 0$, $k^Y{}_{1\text{-}C} = k^Y{}_{2\text{-}C}$, and $k^X{}_{1\text{-}C} = k^X{}_{2\text{-}C}$.

Moreover, when a wave vector of the first B deflection member 32 is $k^v{}_{1\text{-}B}$, X, Y, and Z components of $k^v{}_{1\text{-}B}$ are $k^X{}_{1\text{-}B}$, $k^Y{}_{1\text{-}B}$, and $k^Z{}_{1\text{-}B}$, a wave vector of the second B deflection member 42 is $k^v{}_{2\text{-}B}$, and X, Y, and Z components of $k^v{}_{2\text{-}B}$ are $k^X{}_{2\text{-}B}$, $k^Y{}_{2\text{-}B}$, and $k^Z{}_{2\text{-}B}$, $k^X{}_{1\text{-}B} + k^X{}_{2\text{-}B} = 0$, $k^Y{}_{1\text{-}B} = k^Y{}_{2\text{-}B}$, and $k^Z{}_{1\text{-}B} = k^Z{}_{2\text{-}C}$. Here, $k^v{}_{1\text{-}A} + k^v{}_{1\text{-}B} + k^v{}_{1\text{-}C} = 0$, and $k^v{}_{2\text{-}A} + k^v{}_{2\text{-}B} + k^v{}_{2\text{-}C} = 0$ are satisfied.

In the example illustrated in FIG. 2B, a triangle formed by the wave vectors $k^v{}_{1\text{-}A}$, $k^v{}_{1\text{-}B}$, and $k^v{}_{1\text{-}C}$ conceptually illustrated is a scalene triangle, and a value of a grating period $d_1$ of the first A deflection member and the like is, for example, 335.00 nm, a value of a grating period $d_2$ of the first B deflection member and the like is, for example, 359.26 nm, and a value of a grating period $d_3$ of the first C deflection member and the like is, for example, 384.22 nm.

Furthermore, when average diffraction efficiency of the first A deflection member 31 is $\eta_{1\text{-}A}$, average diffraction efficiency of the first B deflection member 32 is $\eta_{1\text{-}B}$, and average diffraction efficiency of the first C deflection member 33 is $\eta_{1\text{-}C}$ with respect to the light emitted from the image formation device 60, $\eta_{1\text{-}B}/\eta_{1\text{-}A} < 1$ and $\eta_{1\text{-}C}/\eta_{1\text{-}A} < 1$ are satisfied, and when average diffraction efficiency of the second A deflection member 41 is $\eta_{2\text{-}A}$, average diffraction efficiency of the second B deflection member 42 is $\eta_{2\text{-}B}$ and average diffraction efficiency of the second C deflection member is $\eta_{2\text{-}C}$ with respect to the light emitted from the image formation device 60, $\eta_{2\text{-}B}/\eta_{2\text{-}A} < 1$ and $\eta_{2\text{-}C}/\eta_{2\text{-}A} < 1$ are satisfied.

As illustrated in FIG. 6A, the image formation device 60 (hereinafter, the image formation device illustrated in FIG. 6A will be referred to as an image formation device 60A) is the image formation device of the first configuration, and has a plurality of pixels arranged in a two-dimensional matrix. Specifically, the image formation device 60A includes a reflective type spatial light modulation device and a light source 71 including a light emitting diode (LED) that emits a white light. Each image formation device 60A is housed entirely in a housing 70 (indicated by an alternate long and short dash line in FIG. 6A), the housing 70 is provided with an opening (not illustrated), and a light is emitted from an optical system (parallel light emitting optical system, collimating optical system) 74 through the opening. The housing 70 is attached to an upper part of a front portion 51 by an attachment member that is not illustrated. The reflective type spatial light modulation device includes a liquid crystal display device (LCD) 73 including a LCOS as a light bulb. Moreover, there is provided a polarizing beam splitter 72 that reflects a part of light from the light source 71 and guides the light to the liquid crystal display device 73, and also passes a part of light reflected by the liquid crystal display device 73 and guides the light to the optical system 74. The liquid crystal display device 73 includes a plurality of (for example, 640×480) pixels (liquid crystal cells, liquid crystal display elements) arranged in a two-dimensional matrix. The polarizing beam splitter 72 has a known configuration and structure. An unpolarized light emitted from the light source 71 collides with the polarizing beam splitter 72. In the polarizing beam splitter 72, a P polarization component passes through and is emitted to the outside of the system. On the other hand, an S polarization component is reflected by the polarizing beam splitter 72, enters the liquid crystal display device 73, is reflected inside the liquid crystal display device 73, and is emitted from the liquid crystal display device 73. Here, among lights emitted from the liquid crystal display device 73, a light emitted from a pixel displaying "white" contains a large amount of P polarization components, and a light emitted from a pixel displaying "black" contains a large amount of S polarization components. Therefore, among lights emitted from the liquid crystal display device 73 and collide with the polarizing beam splitter 72, P polarization components pass through the polarizing beam splitter 72 and are guided to the optical system 74. On the other hand, S polarization components are reflected by the polarizing beam splitter 72 and returned to the light source 71. The optical system 74 includes, for example, a convex lens, and an image formation device 60A (more specifically, the liquid crystal display device 73) is arranged at a location (position) of a focal length in the optical system 74 in order to generate parallel light. An image emitted from the image formation device 60A is incident on the first A deflection member 31 and the second A deflection member 41 via a light guide means that is not illustrated. The liquid crystal display device 73 includes a plurality of (for example, 640×480) pixels (liquid crystal cells, liquid crystal display elements) arranged in a two-dimensional matrix.

Alternatively, as illustrated in FIG. 6B, the image formation device 60 (hereinafter, the image formation device illustrated in FIG. 6B will be referred to as an image formation device 60B) includes an organic EL display device 75. The image emitted from the organic EL display device 75 passes through a convex lens 76, becomes parallel light, and proceeds to the first A deflection member 31 and the second A deflection member 41 via a light guide means that is not illustrated. The organic EL display device 75 includes a plurality of (for example, 640×480) pixels (organic EL elements) arranged in a two-dimensional matrix.

Alternatively, as illustrated in FIG. 6C, the image formation device 60 that is the image formation device of the second configuration (hereinafter, the image formation device illustrated in FIG. 6C will be referred to as an image formation device 60C) includes:

a light source 81;

a collimating optical system 82 that causes a light emitted from the light source 81 to be a parallel light;

a scanning means 84 that scans with a parallel light emitted from the collimating optical system 82; and a relay optical system 85 that relays and emits the parallel light scanned by the scanning means 84. Note that the entire image formation device 60C is housed in the housing 70 (indicated by the alternate long and short dash line in FIG. 6C), the housing 70 is provided with an opening (not illustrated), and a light is emitted from the relay optical system 85 through the opening. Then, the housing 70 is attached to the upper part of the front portion 51 by an attachment member that is not illustrated. The light source 81 includes a light emitting element (LED) that emits a green light. Then, the light emitted from the light source 81 is incident on the collimating optical system 82 having positive optical power as the whole, and is emitted as a parallel light. Then, this parallel light is reflected by a total reflection mirror 83, with which horizontal scanning and vertical scanning are performed by the scanning means 84 including a MEMS that has a micromirror rotatable in two-dimensional directions, so as to form a kind of two-dimensional image, thereby generating virtual pixels (whose number of pixels can be the same as, for example, the image formation device 60A). Then, a light from the virtual pixels passes through the relay optical system (parallel light emitting optical system) 85 formed by a known relay optical system, and is incident on the first A deflection member 31 and the second A deflection member 41 via a light guide means that is not illustrated.

Figure 7:
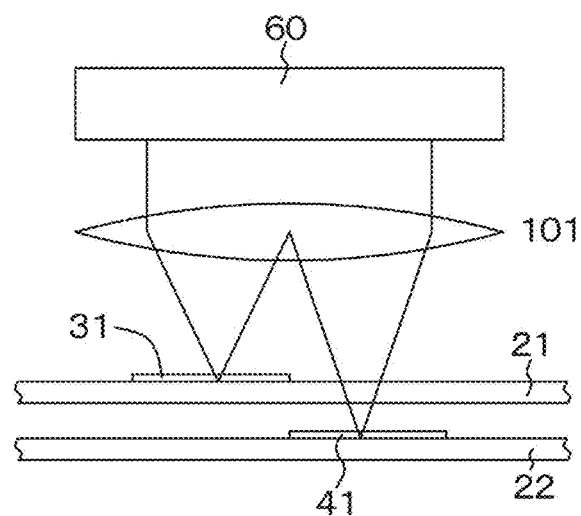
FIG. 7 is a conceptual view illustrating the arrangement of the image formation device, the light guide plate, the first A deflection member, a second A deflection member, and so on in the optical device of the first embodiment.

As illustrated in the conceptual view in FIG. 7, the optical device includes one image formation device 60 (60A, 60B, 60C), and an image emitted from the image formation device 60 may be condensed by lenses 74, 76, 85 (represented by reference numeral 101 in the drawings) and incident on the first A deflection member 31 and the second A deflection member 41. The image emitted from the image formation device 60 is incident on the first A deflection member 31 and the second A deflection member 41 via the lens 101. At this time, an entrance pupil diameter of the lens 101 in the X axis direction is preferably larger than the width of the first A deflection member 31 and the second A deflection member 32 in the X axis direction, and is more preferably the same as the width of the first A deflection member 31 and the second A deflection member 32 in the X axis direction. Note that in FIG. 7, illustration of deflection members other than the first A deflection member 31, the second A deflection member 41, and the light guide plates 21 and 22 is omitted.

The frame 50 constituting the display device include the front portion 51 (including a rim 51') arranged in front of the observer, two temple portions 53 pivotally attached to both ends of the front portion 51 via hinges 52, and a temple tip (also called a tip cell, earpiece, ear pad) 54 attached to a tip of each temple portion 53. Furthermore, nose pads 51" are attached. That is, the assembly of the frame 50 and the nose pads 51" has basically the same structure as ordinary eyeglasses. Moreover, as described above, each housing 70 is attached to the front portion 51 by an attachment member that is not illustrated. The frame 50 includes metal or plastic. Note that each housing 70 may be detachably attached to the front portion 51 by an attachment member.

Moreover, wirings (signal lines, power lines, or the like, partially not illustrated) 55 extending from one of the image formation devices 60 extends from the tip portion of the temple tip 54 via insides of the temple portion 53 and the temple tip 54 to the outside and is connected to a control device (control circuit, control means) 58. Moreover, each image formation device 60 includes a headphone part 56, and a wiring 57 for the headphone part extending from each image formation device 60 extends from the tip portion of the temple tip 54 to the headphone part 56 via the insides of the temple portion 53 and the inside of the temple tip 54. More specifically, the wiring 57 for the headphone part (partially not illustrated) extends from the tip portion of the temple tip 54 to the headphone part 56 so as to wrap around the back side of the pinna (auricle). With such a configuration, it is possible to obtain a neat display device without giving an impression that the headphone part 56 and the wirings 57 for the headphone part are randomly arranged.

The optical device of the first embodiment, the optical device constituting the image display device of the first embodiment, and the optical device constituting the display device of the first embodiment includes the first deflection unit and the second deflection unit provided on the first light guide plate and the second light guide plate, and a portion (for example, a half) of the image emitted from the image formation device is incident on the first deflection unit, and at least the rest (for example, the remaining half) of the image emitted from the image formation device is incident on the second deflection unit. That is, it is a kind of dividing of the image by the first A deflection member and the second A deflection member. Then, these divided images are finally emitted from the first deflection unit and the second deflection unit and combined, that is, the images emitted from the first C deflection member and the second C deflection member are combined, and reach the pupil of the observer. Therefore, the horizontal angle of view of the image in the conventional optical device can be, for example, doubled. That is, it is possible to provide an optical device having a configuration and a structure capable of further widening the angle of view, an image display device including such an optical device, and a display device including such an image display device. Moreover, since the first direction and the second direction are opposite directions and are not parallel, further widening of the angle of view can be achieved.

In a case where the first deflection unit and the first deflection unit are provided on one light guide plate instead of the first light guide plate and the second light guide plate, there is a risk that a traveling light diffracted and reflected by the first deflection unit and totally reflected in the light guide plate enters the second deflection unit and be diffracted and reflected by the second deflection unit. However, by providing the first deflection unit on the first light guide plate and providing the second deflection unit on the second light guide plate, the light that is diffracted and reflected by the first deflection unit and travels by being totally reflected inside the light guide plate does not enter the second deflection unit, and occurrence of such problem can be prevented.

Second Embodiment

Figure 13:
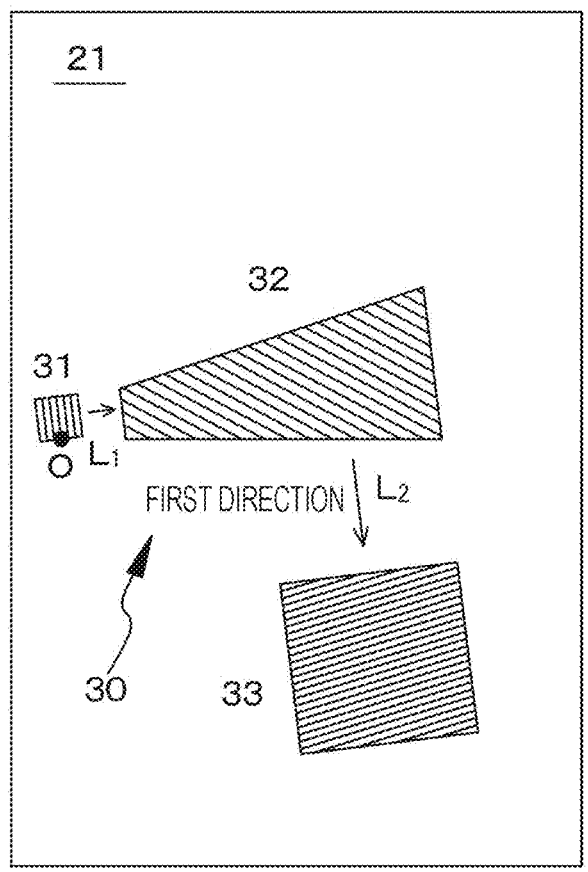
FIG. 13 is a schematic view of a first light guide plate and a first deflection unit constituting an optical device of a second embodiment.
Figure 13:
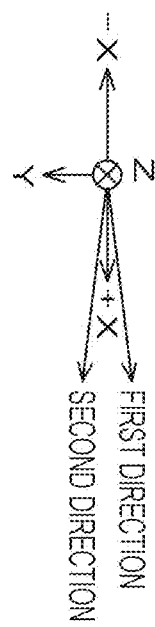
Figure 14:
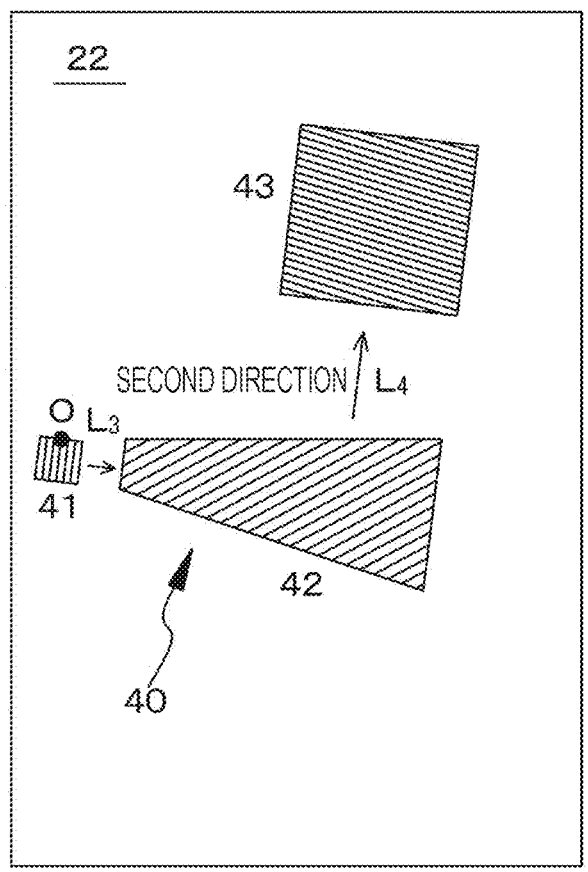
FIG. 14 is a schematic view of a second light guide plate and a second deflection unit constituting the optical device of the second embodiment.

A second embodiment is a modification of the first embodiment. In the first embodiment, it is assumed that the +X axis and the −X axis are located in the horizontal plane. On the other hand, in the second embodiment, the +X axis and the −X axis are located in the vertical plane. Schematic views of the first light guide plate and the first deflection unit and the second light guide plate and the second deflection unit constituting the optical device of the second embodiment are illustrated in FIGS. 13 and 14. FIGS. 13 and 14 illustrate conceptual views of the optical device constituting the image display device for the right eye as viewed from the front, with the observer's ear located on the right hand side of the view and the observer's nose located on the left hand side of the view. That is, the observer's nose is located in a Y axis (specifically, −Y axis) direction, and the observer's ear is located in a Y axis (specifically, +Y axis) direction. The light incident on the light guide plate travels substantially horizontally from the first A deflection member and the second A deflection member toward the first B deflection member and the second B deflection member (that is, the Y axis is located in the horizontal direction). Except for the above points, the optical device of the second embodiment can have a similar configuration and structure to those of the optical device of the first embodiment, and thus detailed description thereof will be omitted. Note that whether to employ the first embodiment or the second embodiment is only required to be determined on the basis of the specifications required for the optical device, the image display device, and the display device.

Although the present disclosure has been described above on the basis of preferred embodiments, the present disclosure is not limited to these embodiments. The configurations and structures of the display device (head-mounted display), the image display device, and the optical device described in the embodiments are examples, and can be changed as appropriate. The deflection member can also be a reflective blazed diffraction grating element. Furthermore, the display device of the present disclosure can also be used as a stereoscopic display device. In this case, if necessary, it is only required that a polarizing plate or a polarizing film is detachably attached to the optical device, or the polarizing plate or the polarizing film is attached to the optical device. The image display device may include a light control device. That is, the optical device may overlap at least a part of the light control device. More specifically, it is preferable that at least the first C deflection member and the like of the optical device overlaps with the light control device.

In the first embodiment, although the example in which the light emitted from the first A deflection member and the second A deflection member propagates downward of the light guide plate has been described, a mode can be employed in which the light is propagated upward of the light guide plate.

On a material constituting one volume hologram diffraction grating, the first A deflection member and the like and the first B deflection member and the like may be formed, the first A deflection member and the like and the first C deflection member and the like may be formed, the first B deflection member and the like and the first C deflection member and the like may be formed, or the first A deflection member and the like, the first B deflection member and the like, the first C deflection member and the like, and the first B deflection member and the like may be formed. A hologram area may be formed on the light guide plate on the basis of an imprint method or an etching method.

Figure 15A:
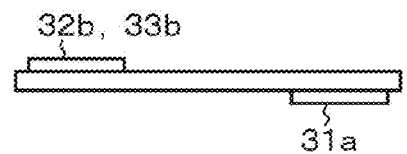
FIG. 15A, FIG. 15B, FIG. 15C, FIG. 15D, FIG. 15E, FIG. 15F, FIG. 15G, and FIG. 15H are conceptual views of modification examples of the optical device of the first embodiment.
Figure 15B:
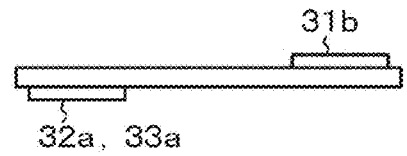
Figure 15C:
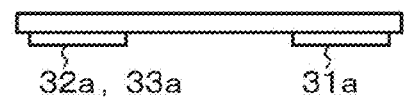
Figure 15D:
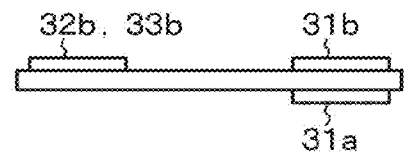
Figure 15E:
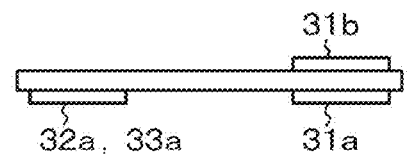
Figure 15F:
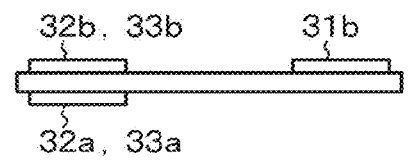
Figure 15G:
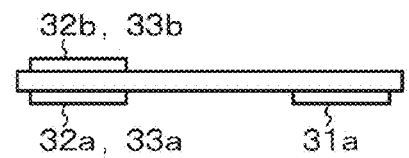
Figure 15H:
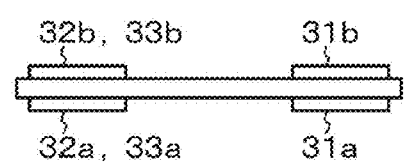

A conceptual view of a modification example of the optical device described in the first embodiment can also be modified as will be described below with reference to FIGS. 15A, 15B, 15C, 15D, 15E, 15F, 15G, and 15H. That is, as illustrated in FIG. 15A, a first A deflection member and the like 31a including a transmissive type volume hologram diffraction grating may be arranged on a first surface of a light guide plate, and a first B deflection member and the like 32b and a first C deflection member and the like 33b including a reflective type volume hologram diffraction grating may be arranged on a second surface of the light guide plate. Alternatively, as illustrated in FIG. 15B, a first B deflection member and the like 32a and a first C deflection member and the like 33a including a transmissive type volume hologram diffraction grating may be arranged on the first surface of the light guide plate and a first A deflection member and the like 31b including a reflective type volume hologram diffraction grating may be arranged on the second surface of the light guide plate. Alternatively, as illustrated in FIG. 15C, the first A deflection member and the like 31a, the first B deflection member and the like 32a, and the first C deflection member and the like 33a including a transmissive type volume hologram diffraction grating may be arranged on the first surface of the light guide plate. Alternatively, as illustrated in FIG. 15D, the first A deflection member and the like 31a including a transmissive type volume hologram diffraction grating may be arranged on the first surface of the light guide plate, and the first A deflection member and the like 31b, the first B deflection member and the like 32b, and the first C deflection member and the like 33b including a reflective type volume hologram diffraction grating may be arranged on the second surface of the light guide plate. Alternatively, as illustrated in FIG. 15E, the first A deflection member and the like 31a, the first B deflection member and the like 32a, and the first C deflection member and the like 33a including a transmissive type volume hologram diffraction grating may be arranged on the first surface of the light guide plate, and the first A deflection member and the like 31b including a reflective type volume hologram diffraction grating may be arranged on the second surface of the light guide plate. Alternatively, as illustrated in FIG. 15F, the first B deflection member and the like 32a and the first C deflection member and the like 33a including a transmissive type volume hologram diffraction grating may be arranged on the first surface of the light guide plate, and the first A deflection member and the like 31b, the first B deflection member and the like 32b, and the first C deflection member and the like 33b including a reflective type volume hologram diffraction grating may be arranged on the second surface of the light guide plate. Alternatively, as illustrated in FIG. 15G, the first A deflection member and the like 31a, the first B deflection member and the like 32a, and the first C deflection member and the like 33a including a transmissive type volume hologram diffraction grating may be arranged on the first surface of the light guide plate, and the first B deflection member and the like 32b and the first C deflection member and the like 33b including a reflective type volume hologram diffraction grating may be arranged on the second surface of the light guide plate. Alternatively, as illustrated in FIG. 15H, the first A deflection member and the like 31a, the first B deflection member and the like 32a, and the first C deflection member and the like 33a including a transmissive type volume hologram diffraction grating may be arranged on the first surface of the light guide plate, and the first A deflection member and the like 31b, the first B deflection member and the like 32b, and the first C deflection member and the like 33b including a reflective type volume hologram diffraction grating may be arranged on the second surface of the light guide plate.

Specifically, a mode can be employed in which the light control device includes:
- a first substrate;
- a second substrate that opposes the first substrate;
- a first transparent electrode provided on an opposing surface of the first substrate that opposes the second substrate;
- a second transparent electrode provided on an opposing surface of the second substrate that opposes the first substrate; and
- a light control layer sandwiched between the first transparent electrode and the second transparent electrode. Note that when the light control device is operating, when the light control device is operating, for example, a voltage higher than that of the second transparent electrode is applied to the first transparent electrode.

A mode can be employed in which the light control layer includes a light shutter to which a color change of substance generated by a redox reaction of an inorganic or organic electrochromic material is applied. Specifically, a mode can be employed in which the light control layer contains an inorganic or organic electrochromic material, and moreover, a mode can be employed in which the light control layer has a stacked structure of inorganic electrochromic material layers such as a $WO_3$ layer/$Ta_2O_5$ layer/$Ir_xSn_{1-x}O$ layer or a stacked structure of inorganic electrochromic material layers such as $WO_3$ layer/$Ta_2O_5$ layer/$IrO_x$ layer from the first transparent electrode side. A $MoO_3$ layer or a $V_2O_5$ layer can be used instead of the $WO_3$ layer. Furthermore, instead of the $IrO_x$ layer, a $ZrO_2$ layer and a zirconium phosphate layer can be used, or a prussian blue complex/nickel-substituted prussian blue complex or the like can also be used. As the organic electrochromic material, for example, electrochromic materials disclosed in Japanese Patent Application Laid-Open No. 2014-111710 and Japanese Patent Application Laid-Open No. 2014-159385 can also be used.

Alternatively, a mode can be employed in which the light control layer contains an electrophoretic dispersion liquid, and a mode can be employed in which the light control device is a light shutter by an electrodeposition method (electrodeposition/electric field precipitation) applying an electrodeposition/dissociation phenomenon generated by a reversible redox reaction of metal (for example, silver particles), that is, the light control layer contains an electrolyte containing metal ions.

Here, the electrophoretic dispersion liquid includes a large number of charged electrophoretic particles and a dispersion medium having a color different from that of the electrophoretic particles. For example, in a case where the first transparent electrode is patterned and the second transparent electrode is not patterned (what is called a solid electrode configuration) and the electrophoretic particles are negatively charged, when a relatively negative voltage is applied to the first transparent electrode and a relatively positive voltage is applied to the second transparent electrode, the negatively charged electrophoretic particles migrate so as to cover the second transparent electrode. Therefore, a light shielding rate in the light control device is a high value. On the other hand, on the contrary, when a relatively positive voltage is applied to the first transparent electrode and a relatively negative voltage is applied to the second transparent electrode, the electrophoretic particles migrate so as to cover the first transparent electrode. Therefore, the light shielding rate in the light control device is a low value. By appropriately performing application to such a transparent electrode, it is possible to control the light shielding rate in the light control device. The voltage may be direct current or alternating current. The shape of the patterned first transparent electrode is only required to be such that when the electrophoretic particles migrate so as to cover the first transparent electrode and the light shielding rate in the light control device is a low value, the value of the light shielding rate in the light control device can be optimized, and is only required to be determined by performing various tests. If necessary, an insulating layer may be formed on the transparent electrode. As materials constituting the insulating layer, for example, colorless and transparent insulating resins can be mentioned, and specifically, for example, acrylic resin, epoxy resin, fluororesin, silicone resin, polyimide resin, polystyrene resin, and the like can be mentioned.

As materials forming the transparent first substrate and second substrate constituting the light control device, specifically, transparent glass substrates of soda lime glass, white plate glass, or the like, plastic substrates, plastic sheets, and plastic films can be mentioned. Here, as the plastic, polyethylene terephthalate, polyethylene naphthalate, polycarbonate, cellulose ester such as cellulose acetate, a fluoropolymer such as polyvinylidene fluoride or a copolymer of polytetrafluoroethylene and hexafluoropropylene, polyether such as polyoxymethylene, polyolefin such as polyacetal, polystyrene, polyethylene, polypropylene, methylpentene polymer, polyimide such as polyamideimide or polyetherimide, polyamide, polyether sulfone, polyphenylene sulfide, polyvinylidene fluoride, tetraacetylcellulose, brominated phenoxy, polyarylate, polysulfone, or the like can be mentioned. The plastic sheet and the plastic film may have rigidity that does not bend easily, or may have flexibility. In a case where the first substrate and the second substrate are formed by a transparent plastic substrate, a barrier layer constituted of an inorganic material or an organic material may be formed on an inner surface of the substrate.

The first substrate and the second substrate are sealed and bonded by a sealing member at an outer edge portion. As a sealing member also called a sealing agent, various resins of heat-curable type, photo-curable type, moisture-curable type, and anaerobic curable type, such as epoxy resin, urethane resin, acrylic resin, vinyl acetate resin, ene-thiol resin, silicone resin, modified polymer resin, or the like can be used.

If one of the substrates constituting the light control device is formed to also serve as a component of the optical device (specifically, a protective member arranged so that the volume hologram diffraction grating does not come into direct contact with the atmosphere), the weight of the entire display device can be reduced, and there is no risk of causing discomfort to the user of the display device. Note that a configuration can be employed in which the other substrate is thinner than the one substrate.

The first transparent electrode may or may not be patterned. The second transparent electrode may or may not be patterned. As materials constituting the first transparent electrode and the second transparent electrode, specifically, indium-tin oxide composite oxide (including ITO, indium tin oxide, Sn-doped $In_2O_3$, crystalline ITO, and amorphous ITO), and fluorine-doped $SnO_2$ (FTO), F-doped $In_2O_3$ (IFO), antimony-doped $SnO_2$ (ATO), $SnO_2$, ZnO (including Al-doped ZnO and B-doped ZnO), indium-zinc oxide (IZO), spinel-type oxides, oxides having a $YbFe_2O_4$ structure, conductive polymers such as polyaniline, polypyrrole, and polythiophene, or the like, can be mentioned but it is not limited to these materials, and two or more of these materials can be combined and used. The first transparent electrode and the second transparent electrode can be formed on the basis of physical vapor deposition (PVD method) such as vacuum deposition method and sputtering method, various chemical vapor deposition methods (CVD methods), and various coating methods or the like, and the patterning can be performed by any method such as an etching method, a lift-off method, and a method using various masks.

A mode can be employed in which the light control device is arranged on the front portion. Then, in this case, a mode can be employed in which the front portion has a rim, and the light control device is fitted into the rim. Furthermore, in the display device of the present disclosure including the various preferable modes described above, the optical device and the light control device may be arranged in this order, or the light control device and the optical device may be arranged in this order, from the observer side.

A mode can be employed in which an illuminance sensor (environmental illuminance measurement sensor) that measures illuminance of the environment in which the display device is placed is further provided and controls the light shielding rate of the light control device on the basis of a measurement result of the illuminance sensor (environmental illuminance measurement sensor). Alternatively, a mode can be employed in which an illuminance sensor (environmental illuminance measurement sensor) that measures illuminance of the environment in which the display device is placed is further provided and controls the illuminance of the image formed by the image formation device on the basis of a measurement result of the illuminance sensor (environmental illuminance measurement sensor). These modes may be combined.

Alternatively, a mode can be employed in which a second illuminance sensor (which may be referred to as a "transmitted light illuminance measurement sensor" for convenience) that measures illuminance based on light transmitted through the light control device from the external environment is further provided and controls the light shielding rate of the light control device on the basis of a measurement result of (transmitted light illuminance measurement sensor). Alternatively, a mode can be employed in which a second illuminance sensor (transmitted light illuminance measurement sensor) that measures illuminance based on light transmitted through the light control device from the external environment is further provided and controls the illuminance of the image formed by the image formation device on the basis of a measurement result of the second illuminance sensor (transmitted light illuminance measurement sensor). Note that it is desirable to employ a mode in which the second illuminance sensor (transmitted light illuminance measurement sensor) is arranged on the observer side of the optical device. At least two second illuminance sensors (transmitted light illuminance measurement sensors) may be arranged to measure illuminance based on light that has passed through a portion with a high light shielding rate and measure the illuminance based on light that has passed through a portion with a low light shielding rate. These modes may be combined. Further, these modes may be combined with a mode in which control is performed on the basis of a measurement result of the above-described illuminance sensor (environmental illuminance measurement sensor).

The illuminance sensor (environmental illuminance measurement sensor, transmitted light illuminance measurement sensor) is only required to include a known illuminance sensor, and control of the illuminance sensor is only required to be performed on the basis of a known control circuit.

A configuration can be employed in which the maximum light transmittance of the light control device is 50% or more, and the minimum light transmittance of the light control device is 30% or less. Note that an upper limit of the maximum light transmittance of the light control device can be 99%, and a lower limit of the minimum light transmittance of the light control device can be 1%. Here, there is a relationship of (light transmittance)=1−(light shielding rate).

A connector may be attached to the light control device (specifically, a connector may be attached to the first transparent electrode or the second transparent electrode), and the light control device is only required to be electrically connected via this connector and wiring to a control circuit (light control device-control circuit, for example, included in the control device for controlling the image formation device) that controls the light shielding rate of the light control device.

In some cases, a configuration can be employed in which the light passing through the light control device can be configured to be colored in a desired color by the light control device. Then, in this case, a mode can be employed in which a color to be colored by the light control device is variable, or a mode can be employed in which the color to be colored by the light control device is fixed. Note that in the former case, for example, it is only required to employ a mode in which a light control device colored in red, a light control device colored in green, and a light control device colored in blue are stacked. Furthermore, in the latter case, although it is not limited, brown can be exemplified as the color to be colored by the light control device.

The observer observes brightness of light that has passed through the light control device and the optical device, and the observer can manually control and adjust the light shielding rate by operating switches, buttons, dials, sliders, knobs, or the like, or can control and adjust the light shielding rate on the basis of a measurement result of the above-described second illuminance sensor (transmitted light illuminance measurement sensor) that measures illuminance based on the light transmitted through the light control device from the external environment. Note that, specifically, the control and adjustment of the light shielding rate is only required to be performed by controlling the voltage applied to the first transparent electrode and the second transparent electrode. At least two second illuminance sensors (transmitted light illuminance measurement sensors) may be arranged to measure illuminance based on light that has passed through a portion with a high light shielding rate and measure the illuminance based on light that has passed through a portion with a low light shielding rate. The display device may be provided with one image display device or two display devices. In a case where two image display devices are provided, by adjusting the voltage applied to the first transparent electrode and the second transparent electrode by one light control device and the other light control device, respectively, it is possible to equalize the light shielding rate in the one light control device and the light shielding rate in the other light control device. The light shielding rate of the one light control device and the light shielding rate of the other light control device can be controlled on the basis of, for example, a measurement result of a second illuminance sensor (transmitted light illuminance measurement sensor) that measures illuminance based on the light transmitted through the light control device from the external environment described above, or the observer can observe brightness of the light passing through the one light control device and the optical device and brightness of the light passing through the other light control device and the optical device, and the observer can manually control and adjust the light shielding rates by operating switches, buttons, dials, sliders, knobs, and the like. In a case where the light shielding rates are adjusted, a test pattern may be displayed on the optical device.

Note that the present disclosure can also employ the following configurations.

[A01] <<Optical Device>>

An optical device in which a light emitted from an image formation device is incident, guided, and emitted, the optical device including a first light guide plate and a second light guide plate, and a first deflection unit provided on the first light guide plate and a second deflection unit provided on the second light guide plate, in which the first deflection unit includes a first A deflection member, a first B deflection member, and a first C deflection member, the second deflection unit includes a second A deflection member, a second B deflection member, and a second C deflection member, a part of the light emitted from the image formation device is incident on the first A deflection member, a light incident on the first A deflection member is deflected by the first A deflection member, totally reflected inside the first light guide plate and incident on the first B deflection member, deflected by the first B deflection member, totally reflected inside the first light guide plate and incident on the first C deflection member, deflected by the first C deflection member, and emitted toward a pupil of an observer, at least a rest of the light emitted from the image formation device is incident on the second A deflection member, a light incident on the second A deflection member is deflected by the second A deflection member, totally reflected inside the second light guide plate, incident on the second B deflection member, deflected by the second B deflection member, totally reflected inside the second light guide plate, incident on the second C deflection member, deflected by the second C deflection member, and emitted toward the pupil of the observer, and when a direction in which a propagation direction of a light deflected by the first B deflection member in the first light guide plate is orthogonally projected onto the first light guide plate is a first direction, and a direction in which a propagation direction of a light deflected by the second B deflection member in the second light guide plate is orthogonally projected onto the first light guide plate is a second direction, the first direction is opposite to the second direction.

[A02] The optical device according to [A01], in which the first light guide plate and the second light guide plate are juxtaposed.

[A03] The optical device according to [A01] or [A02], in which a point on the first light guide plate where a light beam emitted from an image formation area center point of the image formation device collides with the first light guide plate is an origin, in an XYZ Cartesian coordinate system passing through the origin, when an axis including a bisector toward a first direction is a +X axis, the bisector being of a sharp intersection angle within an intersection angle between a straight line passing through the origin and parallel to the first direction and a straight line passing through the origin and parallel to the second direction intersect, an axis that passes through the origin and is perpendicular to the first light guide plate is a Z axis, and an axis orthogonal to an X axis and the Z axis is a Y axis, the first deflection unit and the second deflection unit are arranged at positions symmetrical with respect to a YZ plane.

[A04] The optical device according to [A03], in which the first deflection unit is arranged in a state of being rotated in a first rotation direction in a counterclockwise direction or a clockwise direction with the Z axis being a center, and the second deflection unit is arranged in a state of being rotated in a second rotation direction in the clockwise direction or the counterclockwise direction with the Z axis being a center.

[A05] The optical device according to [A04], in which when a rotation angle in the first rotation direction is $\varphi_1$ and a rotation angle in the second rotation direction is $\varphi_2$ with reference to the +X axis, $|\varphi_1|=|\varphi_2|$ is satisfied.

[A06] The optical device according to [A05], in which 0 (degrees)<$|\varphi_1|=|\varphi_2|$≤23 (degrees) is satisfied.

[A07] The optical device according to any one of [A03] to [A06], in which when an angle formed by a direction of the light incident on the first B deflection member and a direction of a light emitted from the first B deflection member is $\psi_1$, an angle formed by a direction of the light incident on the second B deflection member, and a direction of a light emitted from the second B deflection member is $\psi_2$, 90 degrees<$\psi_1$, and 90 degrees<$\psi_2$ are satisfied.

[A08] The optical device according to [A07], in which 90 degrees<$\psi_1$≤105 degrees, and 90 degrees<$\psi_2$≤105 degrees are satisfied.

[A09] The optical device according to [A07] or [A08], in which $\psi_1=\psi_2$ is satisfied.

[A10] The optical device according to any one of [A01] to [A09], in which a point on the first light guide plate where a light beam emitted from an image formation area center point of the image formation device collides with the first light guide plate is an origin, in an XYZ Cartesian coordinate system passing through the origin, when an axis including a bisector toward a first direction is a +X axis, the bisector being of a sharp intersection angle within an intersection angle between a straight line passing through the origin and parallel to the first direction and a straight line passing through the origin and parallel to the second direction intersect, an axis that passes through the origin and is perpendicular to the first light guide plate is a Z axis, and an axis orthogonal to an X axis and the Z axis is a Y axis, an angle ($\theta_X$) formed by an orthogonal projection image and the X axis when a light beam emitted from the image formation area center point of the image formation device and is incident on the origin is orthogonally projected onto the first light guide plate is less than 90 degrees.

[A11] The optical device according to [A10], in which 70 (degrees)≤$\theta_0$<90 (degrees) is satisfied.

[A12] The optical device according to [A10] or [A11], in which the angle ($\theta_X$) formed by the orthogonal projection image and the Y axis when the light beam emitted from the image formation area center point of the image formation device and incident on the origin is orthogonally projected onto the YZ plane is −20 degrees or more and 20 degrees or less.

[A13] The optical device according to any one of [A03] to [A12], in which a first B deflection member orthogonal projection image when the first B deflection member is orthogonally projected onto the first light guide plate (XY plane) and a second B deflection member orthogonal projection image when the second B deflection member is orthogonally projected onto the first light guide plate (XY plane) partially overlap.

[A14] The optical device according to [A13], in which an end in a +X axis direction of the first B deflection member orthogonal projection image and an end in a −X axis direction of the second B deflection member orthogonal projection image overlap.

[A15] The optical device according to any one of [A03] to [A14], in which the first A deflection member and the second A deflection member include a volume hologram diffraction grating, and when a wave vector of the first A deflection member is $k^v_{1-A}$, X, Y, and Z components of $k^v_{1-A}$ are $k^X_{1-A}$, $k^Y_{1-A}$, and $k^Z_{1-A}$, a wave vector of the second A deflection member is $k^v_{2-A}$, and X, Y, and Z components of $k^v_{2-A}$ are $k^X_{2-A}$, $k^Y_{2-A}$, and $k^Z_{2-A}$, $k^X_{1-A} + k^X_{2-A} = 0$, $k^Y_{1-A} = k^Y_{2-A}$, and $k^Z_{1-A} = k^Z_{2-A}$ are satisfied.

[A16] The optical device according to [A15], in which the first C deflection member and the second C deflection member include a volume hologram diffraction grating, and when a wave vector of the first C deflection member is $k^v_{1-C}$, X, Y, and Z components of $k^v_{1-C}$ are $k^X_{1-C}$, $k^Y_{1-C}$, and $k^Z_{1-C}$, a wave vector of the second C deflection member is $k^v_{2-C}$, and X, Y, and Z components of $k^v_{2-C}$ are $k^X_{2-C}$, $k^Y_{2-C}$, and $k^Z_{2-C}$, $k^X_{1-C} + k^X_{2-C} = 0$, $k^Y_{1-C} = k^Y_{2-C}$, and $k^Z_{1-C} = k^Z_{2-C}$ are satisfied.

[A17] The optical device according to [A16], in which the first B deflection member and the second B deflection member include a volume hologram diffraction grating, and when a wave vector of the first B deflection member is $k^v_{1-B}$, X, Y, and Z components of $k^v_{1-B}$ are $k^X_{1-B}$, $k^Y_{1-B}$, and $k^Z_{1-B}$, a wave vector of the second B deflection member is $k^v_{2-B}$, and X, Y, and Z components of $k^v_{2-B}$ are $k^X_{2-B}$, $k^Y_{2-B}$, and $k^Z_{2-B}$, $k^X_{1-B} + k^X_{2-B} = 0$, $k^Y_{1-B} = k^Y_{2-B}$, and $k^Z_{1-B} = k^Z_{2-C}$ are satisfied.

[A18] The optical device according to [A17], in which $k^v_{1-A} + k^v_{1-B} + k^v_{1-C} = 0$, and $k^v_{2-A} + k^v_{2-B} + k^v_{2-C} = 0$ are satisfied.

[A19] The optical device according to any one of [A01] to [A18], in which when the first A deflection member, the first B deflection member, and the first C deflection member include a volume hologram diffraction grating, and average diffraction efficiency of the first A deflection member is $\eta_{1-A}$, average diffraction efficiency of the first B deflection member is $\eta_{1-B}$, and average diffraction efficiency of the first C deflection member is $\eta_{1-C}$ with respect to the light emitted from the image formation device, $\eta_{1-B}/\eta_{1-A} < 1$, and $\eta_{1-C}/\eta_{1-A} < 1$ are satisfied, and when the second A deflection member, the second B deflection member, and the second C deflection member include a volume hologram diffraction grating, and average diffraction efficiency of the second A deflection member is $\eta_{2-A}$, average diffraction efficiency of the second B deflection member is $\eta_{2-B}$, and average diffraction efficiency of the second C deflection member is $\eta_{2-C}$ with respect to the light emitted from the image formation device, $\eta_{2-B}/\eta_{2-A} < 1$, and $\eta_{2-C}/\eta_{2-A} < 1$ are satisfied.

[B01] <<Image Display Device>>

An image display device including:

an image formation device; and an optical device in which a light emitted from the image formation device is incident, guided, and emitted, in which the optical device includes a first light guide plate and a second light guide plate, and a first deflection unit provided on the first light guide plate and a second deflection unit provided on the second light guide plate, the first deflection unit includes a first A deflection member, a first B deflection member, and a first C deflection member, the second deflection unit includes a second A deflection member, a second B deflection member, and a second C deflection member, a part of the light emitted from the image formation device is incident on the first A deflection member, a light incident on the first A deflection member is deflected by the first A deflection member, totally reflected inside the first light guide plate and incident on the first B deflection member, deflected by the first B deflection member, totally reflected inside the first light guide plate and incident on the first C deflection member, deflected by the first C deflection member, and emitted toward a pupil of an observer, at least a rest of the light emitted from the image formation device is incident on the second A deflection member, a light incident on the second A deflection member is deflected by the second A deflection member, totally reflected inside the second light guide plate, incident on the second B deflection member, deflected by the second B deflection member, totally reflected inside the second light guide plate, incident on the second C deflection member, deflected by the second C deflection member, and emitted toward the pupil of the observer, and when a direction in which a propagation direction of a light deflected by the first B deflection member in the first light guide plate is orthogonally projected onto the first light guide plate is a first direction, and a direction in which a propagation direction of a light deflected by the second B deflection member in the second light guide plate is orthogonally projected onto the first light guide plate is a second direction, the first direction is opposite to the second direction.

[B02] <<Image Display Device>>

An image display device including:
an image formation device; and
an optical device in which a light emitted from the image formation device is incident, guided, and emitted,
in which the optical device includes the optical device according to any one of [A01] to [A19].

[C01] <<Display Device>>

A display device including:
a frame attached to a head of an observer; and
an image display device attached to the frame,
in which the image display device includes an image formation device and an optical device in which a light emitted from the image formation device is incident, guided, and emitted,
the optical device includes a first light guide plate and a second light guide plate, and a first deflection unit provided on the first light guide plate and a second deflection unit provided on the second light guide plate,
the first deflection unit includes a first A deflection member, a first B deflection member, and a first C deflection member,
the second deflection unit includes a second A deflection member, a second B deflection member, and a second C deflection member,
a part of the light emitted from the image formation device is incident on the first A deflection member,
a light incident on the first A deflection member is deflected by the first A deflection member, totally reflected inside the first light guide plate and incident on the first B deflection member, deflected by the first B deflection member, totally reflected inside the first light guide plate and incident on the first C deflection member, deflected by the first C deflection member, and emitted toward a pupil of an observer,
at least a rest of the light emitted from the image formation device is incident on the second A deflection member,
a light incident on the second A deflection member is deflected by the second A deflection member, totally reflected inside the second light guide plate, incident on the second B deflection member, deflected by the second B deflection member, totally reflected inside the second light guide plate, incident on the second C deflection member, deflected by the second C deflection member, and emitted toward the pupil of the observer, and
when a direction in which a propagation direction of a light deflected by the first B deflection member in the first light guide plate is orthogonally projected onto the first light guide plate is a first direction, and a direction in which a propagation direction of a light deflected by the second B deflection member in the second light guide plate is orthogonally projected onto the first light guide plate is a second direction, the first direction is opposite to the second direction.

[C02] <<Display Device>>

A display device including:
a frame attached to a head of an observer; and
an Image display device attached to the frame,
in which the image display device includes an image formation device and an optical device in which a light emitted from the image formation device is incident, guided, and emitted, and
the optical device includes the optical device according to any one of [A01] to [A19].

REFERENCE SIGNS LIST

10 Optical device
11 Image display device
20 Light guide plate
21 First surface of light guide plate
22 Second surface of light guide plate
23 Support member
31 First A deflection member
32 First B deflection member
33 First C deflection member
41 Second A deflection member
42 Second B deflection member
43 Second C deflection member
50 Frame
51 Front portion
51' Rim
51" Nose pad
52 Hinge
53 Temple portion
54 Temple tip
55 Wiring (signal line, power line, or the like)
56 Headphone part
57 Wiring for headphone part
58 Control device (control circuit, control means)
60, 60A, 60B, 60C Image formation device
70 Housing
71 Light source
72 Polarizing beam splitter (PBS)
73 Liquid crystal display device (LCD)
74 Optical system (parallel light emitting optical system, collimating optical system)
75 Organic EL display device
76 Convex lens
81 Light source
82 Collimating optical system
83 Total reflection mirror
84 Scanning means
85 Relay optical system
90 Pupil of an observer

What is claimed is:

1. An optical device in which a light emitted from an image formation device is incident, guided, and emitted, the optical device comprising:
a first light guide plate;
a second light guide plate;
a first deflection unit provided on the first light guide plate; and
a second deflection unit provided on the second light guide plate,
wherein the first light guide plate is disposed in a first plane,
wherein the second light guide plate is disposed in a second plane,
wherein the first plane is parallel to the second plane,
wherein the first light guide plate is spaced apart from the second light guide plate,
wherein the first deflection unit includes a first A deflection member, a first B deflection member, and a first C deflection member,
wherein the second deflection unit includes a second A deflection member, a second B deflection member, and a second C deflection member, wherein a part of the light emitted from the image formation device is incident on the first A deflection member, wherein a light incident on the first A deflection member is deflected by the first A deflection member, totally reflected inside the first light guide plate and incident on the first B deflection member, deflected by the first B deflection member, totally reflected inside the first light guide plate and incident on the first C deflection member, deflected by the first C deflection member, and emitted toward a pupil of an observer, wherein at least a rest of the light emitted from the image formation device is incident on the second A deflection member, wherein a light incident on the second A deflection member is deflected by the second A deflection member, totally reflected inside the second light guide plate, incident on the second B deflection member, deflected by the second B deflection member, totally reflected inside the second light guide plate, incident on the second C deflection member, deflected by the second C deflection member, and emitted toward the pupil of the observer, and wherein, when a direction in which a propagation direction of a light deflected by the first B deflection member in the first light guide plate is orthogonally projected onto the first light guide plate is a first direction, and a direction in which a propagation direction of a light deflected by the second B deflection member in the second light guide plate is orthogonally projected onto the first light guide plate is a second direction, the first direction is opposite to the second direction.

2. The optical device according to claim 1, wherein the first light guide plate and the second light guide plate are juxtaposed.

3. The optical device according to claim 1, wherein a point on the first light guide plate where a light beam emitted from an image formation area center point of the image formation device collides with the first light guide plate is an origin, in an XYZ Cartesian coordinate system passing through the origin, when an axis including a bisector toward a first direction is a +X axis, the bisector being of a sharp intersection angle within an intersection angle between a straight line passing through the origin and parallel to the first direction and a straight line passing through the origin and parallel to the second direction intersect, an axis that passes through the origin and is perpendicular to the first light guide plate is a Z axis, and an axis orthogonal to an X axis and the Z axis is a Y axis, the first deflection unit and the second deflection unit are arranged at positions symmetrical with respect to a YZ plane.

4. The optical device according to claim 3, wherein the first deflection unit is arranged in a state of being rotated in a first rotation direction in a counterclockwise direction or a clockwise direction with the Z axis being a center, and the second deflection unit is arranged in a state of being rotated in a second rotation direction in the clockwise direction or the counterclockwise direction with the Z axis being a center.

5. The optical device according to claim 4, wherein when a rotation angle in the first rotation direction is $\varphi_1$ and a rotation angle in the second rotation direction is $\varphi_2$ with reference to the +X axis, $|\varphi_1|=|\varphi_2|$ is satisfied.

6. The optical device according to claim 5, wherein 0 (degrees)<$|\varphi_1|=|\varphi_2|$≤23 (degrees) is satisfied.

7. The optical device according to claim 3, wherein when an angle formed by a direction of the light incident on the first B deflection member and a direction of a light emitted from the first B deflection member is $\psi_1$, an angle formed by a direction of the light incident on the second B deflection member, and a direction of a light emitted from the second B deflection member is $\psi_2$, 90 degrees<$\psi_1$, and 90 degrees<$\psi_2$ are satisfied.

8. The optical device according to claim 7, wherein 90 degrees<$\psi_1$≤105 degrees, and 90 DEGREES<$\psi_2$≤105 DEGREES are satisfied.

9. The optical device according to claim 7, wherein $\psi_1=\psi_2$ is satisfied.

10. The optical device according to claim 3, wherein a first B deflection member orthogonal projection image when the first B deflection member is orthogonally projected onto the first light guide plate and a second B deflection member orthogonal projection image when the second B deflection member is orthogonally projected onto the first light guide plate partially overlap.

11. The optical device according to claim 10, wherein an end in a +X axis direction of the first B deflection member orthogonal projection image and an end in a −X axis direction of the second B deflection member orthogonal projection image overlap.

12. The optical device according to claim 3, wherein the first A deflection member and the second A deflection member include a volume hologram diffraction grating, and when a wave vector of the first A deflection member is $k^v_{1-A}$, X, Y, and Z components of $k^v_{1-A}$ are $k^X_{1-A}$, $k^Y_{1-A}$, and $k^Z_{1-A}$, a wave vector of the second A deflection member is $k^v_{2-A}$, and X, Y, and Z components of $k^v_{2-A}$ are $k^X_{2-A}$, $K^Y_{2-A}$, and $k^Z_{2-A}$, $k^X_{1-A}+k^X_{2-A}=0$, $K^Y_{1-A}=k^Y_{2-A}$, and $k^Z_{1-A}=k^Z_{2-A}$ are satisfied.

13. The optical device according to claim 12, wherein the first C deflection member and the second C deflection member include a volume hologram diffraction grating, and when a wave vector of the first C deflection member is $k^v_{1-C}$, X, Y, and Z components of $k^v_{1-C}$ are $k^X_{1-C}$, $k^Y_{1-C}$, and $k^Z_{1-C}$, a wave vector of the second C deflection member is $k^v_{2-C}$, and X, Y, and Z components of $k^v_{2-C}$ are $k^X_{2-C}$, $k^Y_{2-C}$, and $k^Z_{2-C}$, $k^X_{1-C}+k^X_{2-C}=0$, $k^Y_{1-C}=k^Y_{2-C}$, and $k^Z_{1-C}=k^Z_{2-C}$ are satisfied.

14. The optical device according to claim 13, wherein
the first B deflection member and the second B deflection member include a volume hologram diffraction grating, and
when a wave vector of the first B deflection member is $k^v{}_{1\text{-}B}$, X, Y, and Z components of $k^v{}_{1\text{-}B}$ are $k^X{}_{1\text{-}B}$, $K^Y{}_{1\text{-}B}$, and $k^Z{}_{1\text{-}B}$, a wave vector of the second B deflection member is $k^v{}_{2\text{-}B}$, and X, Y, and Z components of $k^Z{}_{2\text{-}B}$ are $k^X{}_{2\text{-}B}$, $k^Y{}_{2\text{-}B}$, and $k^X{}_{2\text{-}B}$, $k^X{}_{1\text{-}B} + k^X{}_{2\text{-}B} = 0$, $k^Y{}_{1\text{-}B} = k^Y{}_{2\text{-}B}$, and $k^Z{}_{1\text{-}B} = k^Z{}_{2\text{-}C}$ are satisfied.

15. The optical device according to claim 14, wherein $k^v{}_{1\text{-}A} + k^v{}_{1\text{-}B} + k^v{}_{1\text{-}C} = 0$, and $k^v{}_{2\text{-}A} + k^v{}_{2\text{-}B} + k^v{}_{2\text{-}C} = 0$ are satisfied.

16. The optical device according to claim 1, wherein
a point on the first light guide plate where a light beam emitted from an image formation area center point of the image formation device collides with the first light guide plate is an origin,
in an XYZ Cartesian coordinate system passing through the origin,
when an axis including a bisector toward a first direction is a +X axis, the bisector being of a sharp intersection angle within an intersection angle between a straight line passing through the origin and parallel to the first direction and a straight line passing through the origin and parallel to the second direction intersect,
an axis that passes through the origin and is perpendicular to the first light guide plate is a Z axis, and
an axis orthogonal to an X axis and the Z axis is a Y axis,
an angle formed by an orthogonal projection image and the X axis when a light beam emitted from the image formation area center point of the image formation device and is incident on the origin is orthogonally projected onto the first light guide plate is less than 90 degrees.

17. The optical device according to claim 1, wherein an air layer is interposed between the first light guide plate and the second light guide plate.

18. The optical device according to claim 1, wherein the light incident on the first A deflection member includes a first wavelength range, and wherein the light incident on the second A deflection member includes the first wavelength range.

19. An image display device, comprising:
an image formation device; and
an optical device in which a light emitted from the image formation device is incident, guided, and emitted,
wherein the optical device includes a first light guide plate and a second light guide plate, and a first deflection unit provided on the first light guide plate and a second deflection unit provided on the second light guide plate,
wherein the first light guide plate is disposed in a first plane,
wherein the second light guide plate is disposed in a second plane,
wherein the first plane is parallel to the second plane,
wherein the first light guide plate is spaced apart from the second light guide plate,
wherein the first deflection unit includes a first A deflection member, a first B deflection member, and a first C deflection member,
wherein the second deflection unit includes a second A deflection member, a second B deflection member, and a second C deflection member,
wherein a part of the light emitted from the image formation device is incident on the first A deflection member,
wherein a light incident on the first A deflection member is deflected by the first A deflection member, totally reflected inside the first light guide plate and incident on the first B deflection member, deflected by the first B deflection member, totally reflected inside the first light guide plate and incident on the first C deflection member, deflected by the first C deflection member, and emitted toward a pupil of an observer,
wherein at least a rest of the light emitted from the image formation device is incident on the second A deflection member,
wherein a light incident on the second A deflection member is deflected by the second A deflection member, totally reflected inside the second light guide plate, incident on the second B deflection member, deflected by the second B deflection member, totally reflected inside the second light guide plate, incident on the second C deflection member, deflected by the second C deflection member, and emitted toward the pupil of the observer, and
wherein, when a direction in which a propagation direction of a light deflected by the first B deflection member in the first light guide plate is orthogonally projected onto the first light guide plate is a first direction, and a direction in which a propagation direction of a light deflected by the second B deflection member in the second light guide plate is orthogonally projected onto the first light guide plate is a second direction, the first direction is opposite to the second direction.

20. A display device comprising:
a frame attached to a head of an observer; and
an image display device attached to the frame,
wherein the image display device includes an image formation device and an optical device in which a light emitted from the image formation device is incident, guided, and emitted,
the optical device includes a first light guide plate and a second light guide plate, and a first deflection unit provided on the first light guide plate and a second deflection unit provided on the second light guide plate,
wherein the first light guide plate is disposed in a first plane,
wherein the second light guide plate is disposed in a second plane,
wherein the first plane is parallel to the second plane,
wherein the first light guide plate is spaced apart from the second light guide plate,
wherein the first deflection unit includes a first A deflection member, a first B deflection member, and a first C deflection member,
wherein the second deflection unit includes a second A deflection member, a second B deflection member, and a second C deflection member,
wherein a part of the light emitted from the image formation device is incident on the first A deflection member,
wherein a light incident on the first A deflection member is deflected by the first A deflection member, totally reflected inside the first light guide plate and incident on the first B deflection member, deflected by the first B deflection member, totally reflected inside the first light guide plate and incident on the first C deflection member, deflected by the first C deflection member, and emitted toward a pupil of an observer, wherein at least a rest of the light emitted from the image formation device is incident on the second A deflection member, wherein a light incident on the second A deflection member is deflected by the second A deflection member, totally reflected inside the second light guide plate, incident on the second B deflection member, deflected by the second B deflection member, totally reflected inside the second light guide plate, incident on the second C deflection member, deflected by the second C deflection member, and emitted toward the pupil of the observer, and wherein, when a direction in which a propagation direction of a light deflected by the first B deflection member in the first light guide plate is orthogonally projected onto the first light guide plate is a first direction, and a direction in which a propagation direction of a light deflected by the second B deflection member in the second light guide plate is orthogonally projected onto the first light guide plate is a second direction, the first direction is opposite to the second direction.

* * * * *